United States Patent
Ashar et al.

(10) Patent No.: US 10,699,362 B2
(45) Date of Patent: Jun. 30, 2020

(54) DIVERGENT CONTROL FLOW FOR FUSED EUS

(71) Applicant: Intel Corporation, Santa Clara, CA (US)

(72) Inventors: Pratik J. Ashar, Sunnyvale, CA (US); Guei-Yuan Ken Lueh, San Jose, CA (US); Kaiyu Chen, Santa Clara, CA (US); Subramaniam Maiyuran, Gold River, CA (US); Brent A. Schwartz, Sacramento, CA (US); Darin M. Starkey, Roseville, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/190,663

(22) Filed: Jun. 23, 2016

(65) Prior Publication Data
US 2017/0372446 A1     Dec. 28, 2017

(51) Int. Cl.
*G06T 1/20*     (2006.01)
*G06F 9/38*     (2018.01)
(Continued)

(52) U.S. Cl.
CPC ............ *G06T 1/20* (2013.01); *G06F 9/30058* (2013.01); *G06F 9/3851* (2013.01); *G06F 9/3887* (2013.01); *G06F 9/45533* (2013.01)

(58) Field of Classification Search
CPC ....... G06T 1/20; G06F 9/3887; G06F 9/3891; G06F 9/45533; G06F 9/3851
(Continued)

(56) References Cited

U.S. PATENT DOCUMENTS 5,671,435 A * 9/1997 Alpert ................. G06F 9/30003
                                                712/38
6,606,704 B1 * 8/2003 Adiletta ................ G06F 9/3004
                                                712/10
(Continued)

FOREIGN PATENT DOCUMENTS

WO    WO 2012009252 A2 *  1/2012    ........... G06F 1/3203

OTHER PUBLICATIONS

Sleiman, F. M., & Wenisch, T. F. (Jun. 2016). Efficiently scaling out-of-order cores for simultaneous multithreading. In 2016 ACM/IEEE 43rd Annual International Symposium on Computer Architecture (ISCA) (pp. 431-443). IEEE.*
(Continued)

*Primary Examiner* — Sarah Lhymn
(74) *Attorney, Agent, or Firm* — Jaffery Watson Mendonsa & Hamilton LLP

(57) ABSTRACT

Embodiments provide support for divergent control flow in heterogeneous compute operations on a fused execution unit. On embodiment provides for a processing apparatus comprising a fused execution unit including multiple graphics execution units having a common instruction pointer; logic to serialize divergent function calls by the fused execution unit, the logic configured to compare a call target of execution channels within the fused execution unit and create multiple groups of channels, each group of channels associated with a single call target; and wherein the fused execution unit is to execute a first group of channels via a first execution unit and a second group of channels via a second execution unit.

22 Claims, 25 Drawing Sheets

(51) Int. Cl.
*G06F 9/30* (2018.01)
*G06F 9/455* (2018.01)

(58) Field of Classification Search
USPC .......... 345/501, 522; 712/11, 13, 15, 16, 17, 712/21, 22, 215, 223, 224, 226
See application file for complete search history.

(56) References Cited

U.S. PATENT DOCUMENTS

| | | | |
|---|---|---|---|
| 6,889,318 B1 | 5/2005 | Wichman | |
| 7,925,861 B2* | 4/2011 | Stuttard | G06F 9/3001 |
| | | | 712/16 |
| 2009/0240931 A1* | 9/2009 | Coon | G06F 9/30054 |
| | | | 712/234 |
| 2012/0210098 A1 | 8/2012 | Chen et al. | |
| 2013/0061027 A1 | 3/2013 | Chen et al. | |
| 2014/0123144 A1* | 5/2014 | Llamas | G06F 9/52 |
| | | | 718/101 |
| 2014/0181477 A1* | 6/2014 | Vaidya | G06F 9/30018 |
| | | | 712/208 |
| 2014/0310484 A1* | 10/2014 | Giroux | G06F 12/08 |
| | | | 711/154 |
| 2015/0205590 A1 | 7/2015 | Sabne et al. | |
| 2016/0316157 A1* | 10/2016 | Desai | H04N 5/3692 |

OTHER PUBLICATIONS

PCT International Search Report and Written Opinion of the International Searching Authority for International Application No. PCT/US2017/030495, dated Sep. 25, 2017, 9 pages.

* cited by examiner

VIRTUAL CALL SUPPORT LOGIC 2300

DETECT A VIRTUAL CALL WITHIN A SET OF INSTRUCTIONS TO BE EXECUTED BY A FUSED EXECUTION UNIT INCLUDING A FIRST EXECUTION UNIT AND A SECOND EXECUTION UNIT, THE FIRST EXECUTION UNIT AND THE SECOND EXECUTION UNIT HAVING A COMMON INSTRUCTION POINTER
2302

DETERMINE THAT THAT THE VIRTUAL CALL DIVERGES TO MULTIPLE CALL TARGETS
2304

GENERATE A FIRST INSTRUCTION TO INSERT BEFORE A FIRST INSTANCE OF THE VIRTUAL CALL, THE FIRST INSTRUCTION TO DISABLE THE SECOND EXECUTION UNIT DURING EXECUTION OF THE FIRST INSTANCE OF THE VIRTUAL CALL
2306

GENERATE A SECOND INSTRUCTION TO INSERT BEFORE A SECOND INSTANCE OF THE VIRTUAL CALL, THE SECOND INSTRUCTION TO DISABLE THE FIRST EXECUTION UNIT DURING EXECUTION OF THE SECOND INSTANCE OF THE VIRTUAL CALL
2308

GENERATE A THIRD INSTRUCTION TO ENABLE ALL EXECUTION UNITS OF THE FUSED EXECUTION UNIT AFTER ALL INSTANCES OF THE VIRTUAL CALL ARE EXECUTED
2310

FIG. 23

VIRTUAL CALL SUPPORT LOGIC 2400

DETECT A VIRTUAL CALL WITHIN A SET OF INSTRUCTIONS TO BE EXECUTED BY A FUSED EXECUTION UNIT INCLUDING A FIRST EXECUTION UNIT AND A SECOND EXECUTION UNIT, THE FIRST EXECUTION UNIT AND THE SECOND EXECUTION UNIT HAVING A COMMON INSTRUCTION POINTER
2402

DETERMINE THAT THE VIRTUAL CALL DIVERGES TO MULTIPLE CALL TARGETS
2404

GENERATE A FIRST INSTRUCTION TO INSERT BEFORE A FIRST INSTANCE OF THE VIRTUAL CALL, THE FIRST INSTRUCTION TO RESTRICT EXECUTION OF THE FIRST INSTANCE OF THE VIRTUAL CALL TO THE FIRST EXECUTION UNIT
2406

GENERATE A SECOND INSTRUCTION TO INSERT BEFORE A SECOND INSTANCE OF THE VIRTUAL CALL, THE SECOND INSTRUCTION TO RESTRICT EXECUTION OF THE SECOND INSTANCE OF THE VIRTUAL CALL TO THE SECOND EXECUTION UNIT
2408

GENERATE A PREDICATE MASK FOR A NOMASK INSTRUCTION TO PREVENT EXECUTION OF THE INSTRUCTION ON A DISABLED EXECUTION UNIT
2410

FIG. 24

DIVERGENT CONTROL FLOW FOR FUSED EUS

TECHNICAL FIELD

Embodiments generally relate to heterogeneous processing logic. More particularly, embodiments relate to logic to support divergent control flow in heterogeneous compute operations on a fused execution unit.

BACKGROUND

Graphics processing units (GPUs) are often used to execute program code including single instruction multiple data (SIMD) instructions. SIMD instructions perform the same operation on multiple data points simultaneously. Additionally, GPUs can also execute program code having a single program multiple data (SPMD) programming model, in which SIMD code is mapped to multiple kernel instances (e.g., work items), which are each executed simultaneously within a given hardware thread. Multiple kernel instances can be associated with a single hardware thread. The number of kernel instances per-thread may be referred to as the SIMD-width of the kernel. Each SPMD kernel instance can appear to execute serially and independently within its own SIMD lane. In actuality, each thread executes a SIMD-width number of kernel instances concurrently.

For a given SIMD-width, if all kernel instances within a thread are executing the same instruction, the SIMD lanes can be maximally utilized. However, if one or more of the kernel instances chooses a divergent branch, then the thread can execute the two paths of the branch separately in a serial manner, which is known as serialization.

BRIEF DESCRIPTION OF THE DRAWINGS

The various advantages of the embodiments will become apparent to one skilled in the art by reading the following specification and appended claims, and by referencing the following drawings, in which:

FIG. 23 is a flow diagram of virtual call support logic associated with a fused execution unit, according to a further embodiment;

FIG. 24 is a flow diagram of additional virtual call support logic, according to a further embodiment.

DESCRIPTION OF EMBODIMENTS

Embodiments provide for a graphics architecture including fused execution units (EUs) with support for divergent calls. Support of divergent SIMD calls is of particular application when compiling program code from languages that support polymorphism, such as, for example, the C++ programming language, for execution on a graphics processor as described herein. One embodiment provides support via a hardware solution. Other embodiments provide support via a combination of hardware and software logic.

For the purposes of explanation, numerous specific details are set forth to provide a thorough understanding of the various embodiments described below. However, it will be apparent to a skilled practitioner in the art that the embodiments may be practiced without some of these specific details. In other instances, well-known structures and devices are shown in block diagram form to avoid obscuring the underlying principles, and to provide a more thorough understanding of embodiments. Although some of the following embodiments are described with reference to a graphics processor, the techniques and teachings described herein may be applied to various types of circuits or semiconductor devices, including general purpose processing devices or graphic processing devices. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In the description that follows, FIGS. 1-14 provide an overview of exemplary data processing system and graphics processor logic that incorporates or relates to the various embodiments. FIGS. 14-25 provide specific details of the various embodiments. Although some of the following embodiments are described with reference to a graphics processor, similar techniques and teachings can be applied to other types of circuits or semiconductor devices, as the teachings are applicable to any processor or machine that manipulates or processes image data.

System Overview

Figure 1:
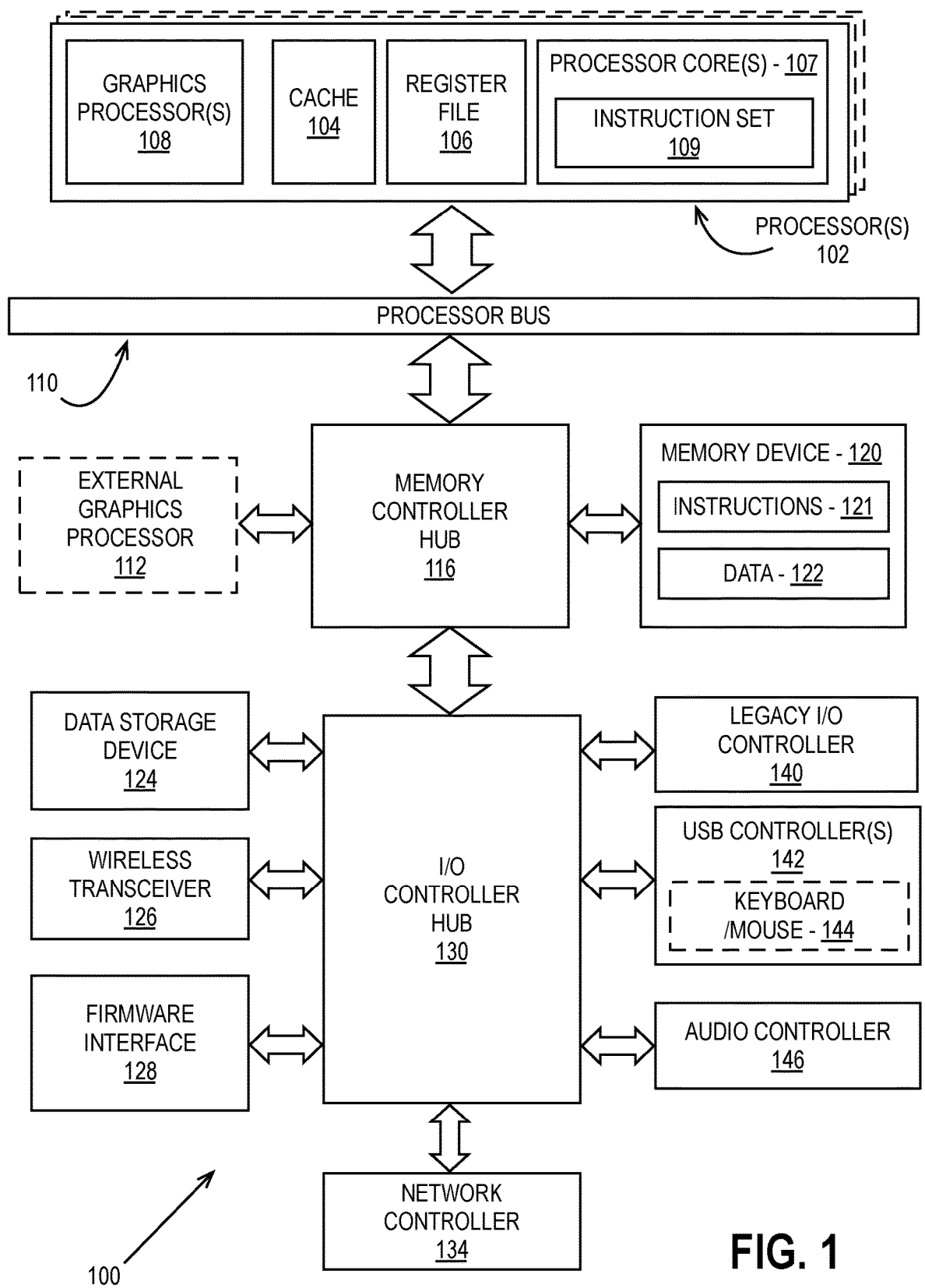
FIG. 1 is a block diagram of an embodiment of a computer system with a processor having one or more processor cores and graphics processors.

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled with a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple with ICH 130. In some embodiments, a high-performance network controller (not shown) couples with processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
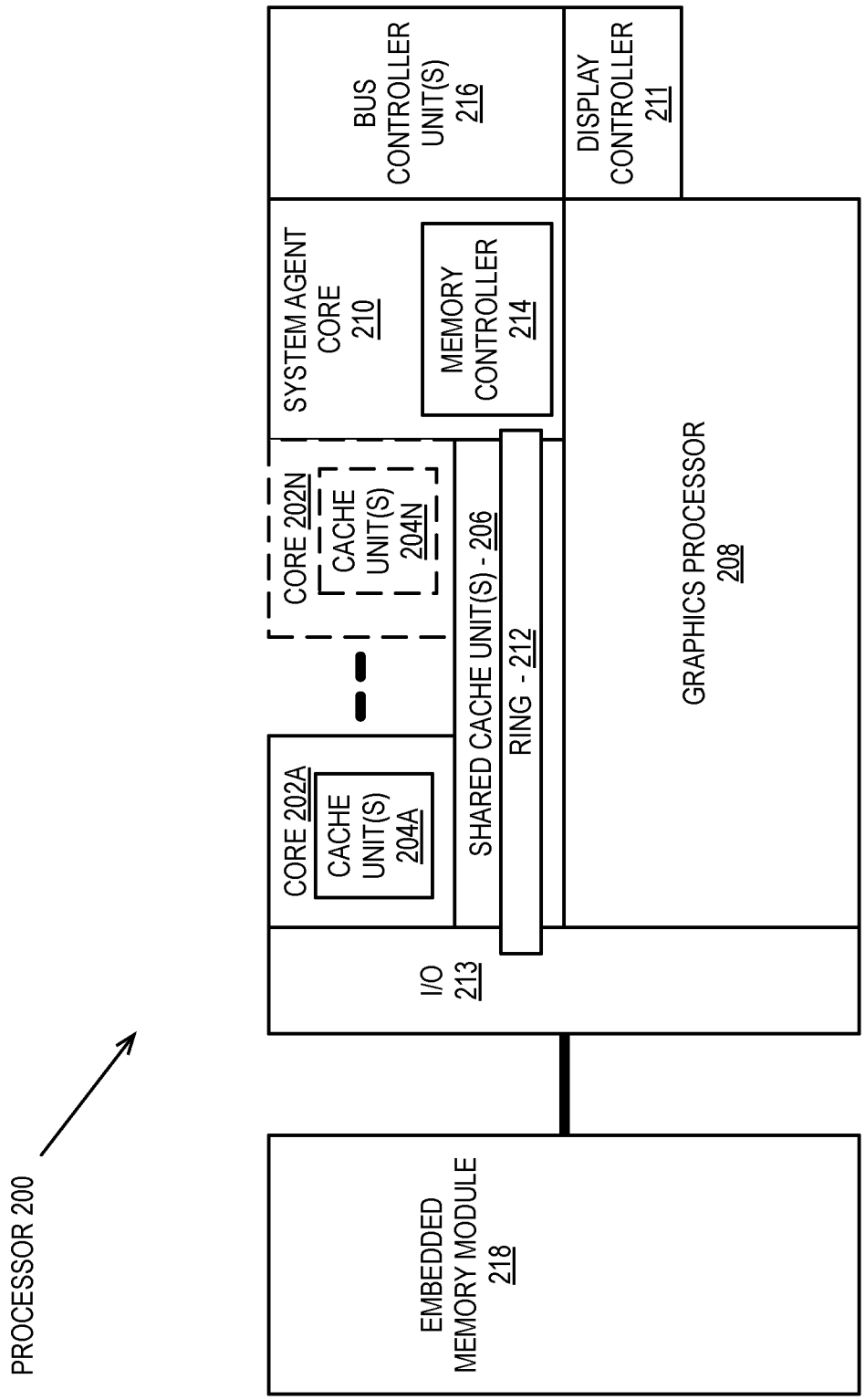
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
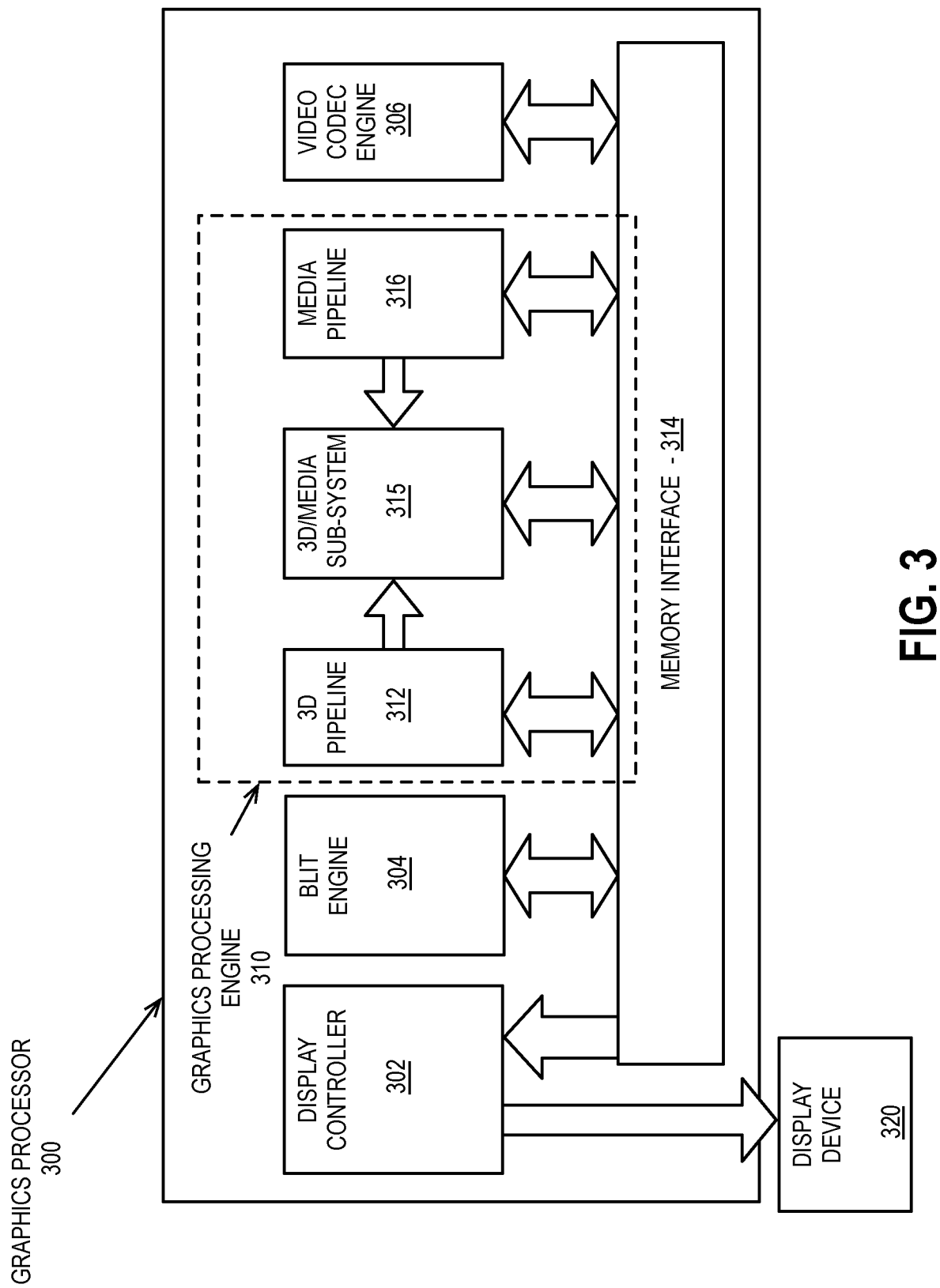
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Graphics Processing Engine

Figure 4:
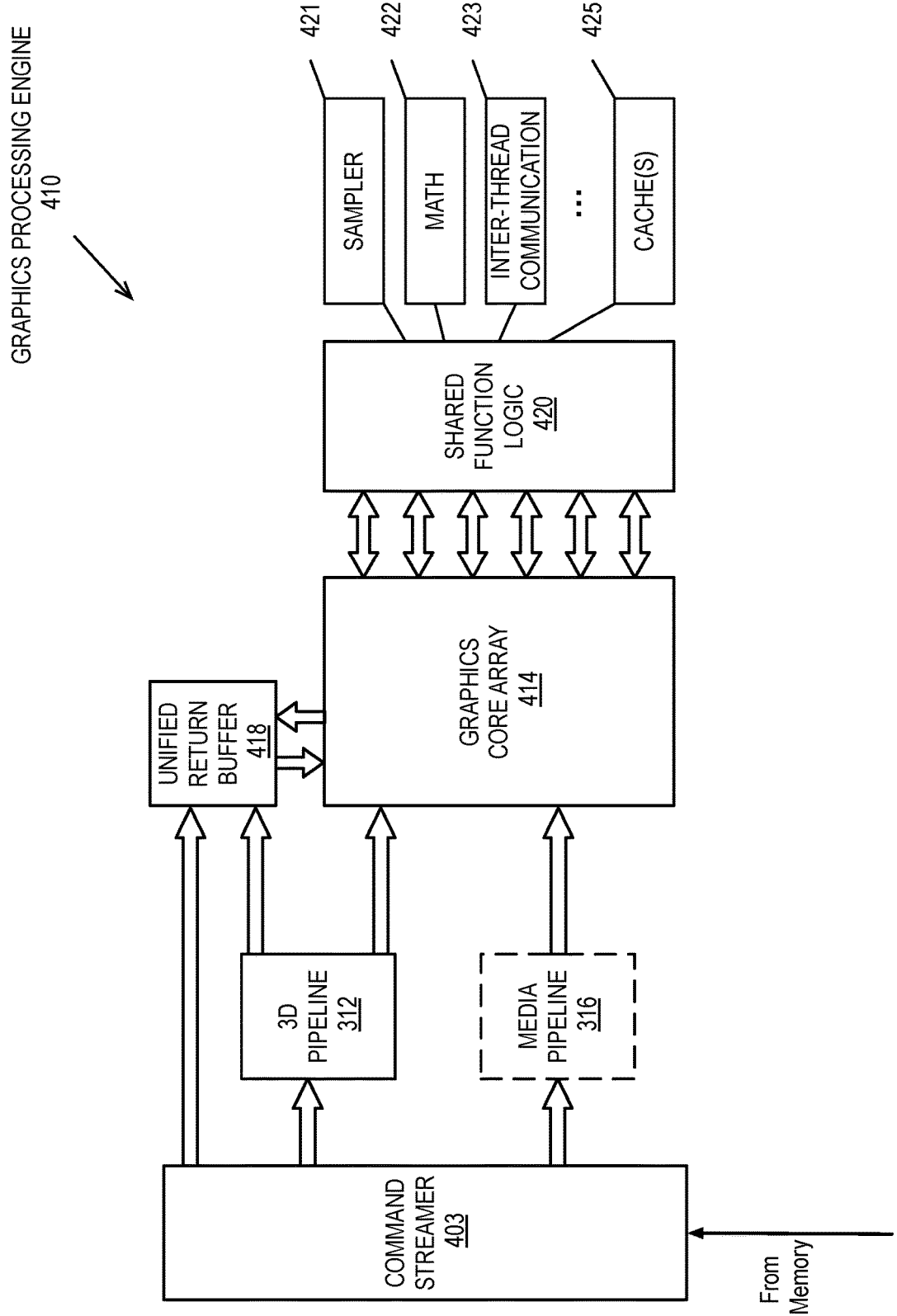
FIG. 4 is a block diagram of an embodiment of a graphics processing engine for a graphics processor.

FIG. 4 is a block diagram of a graphics processing engine 410 of a graphics processor in accordance with some embodiments. In one embodiment, the graphics processing engine (GPE) 410 is a version of the GPE 310 shown in FIG. 3. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3 are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414.

In various embodiments the 3D pipeline 312 can execute one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources. Multi-purpose execution logic (e.g., execution units) within the graphic core array 414 includes support for various 3D API shader languages and can execute multiple simultaneous execution threads associated with multiple shaders.

In some embodiments the graphics core array 414 also includes execution logic to perform media functions, such as video and/or image processing. In one embodiment, the execution units additionally include general-purpose logic that is programmable to perform parallel general purpose computational operations, in addition to graphics processing operations. The general purpose logic can perform processing operations in parallel or in conjunction with general purpose logic within the processor core(s) 107 of FIG. 1 or core 202A-202N as in FIG. 2.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420. A shared function is implemented where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies between embodiments.

Figure 5:
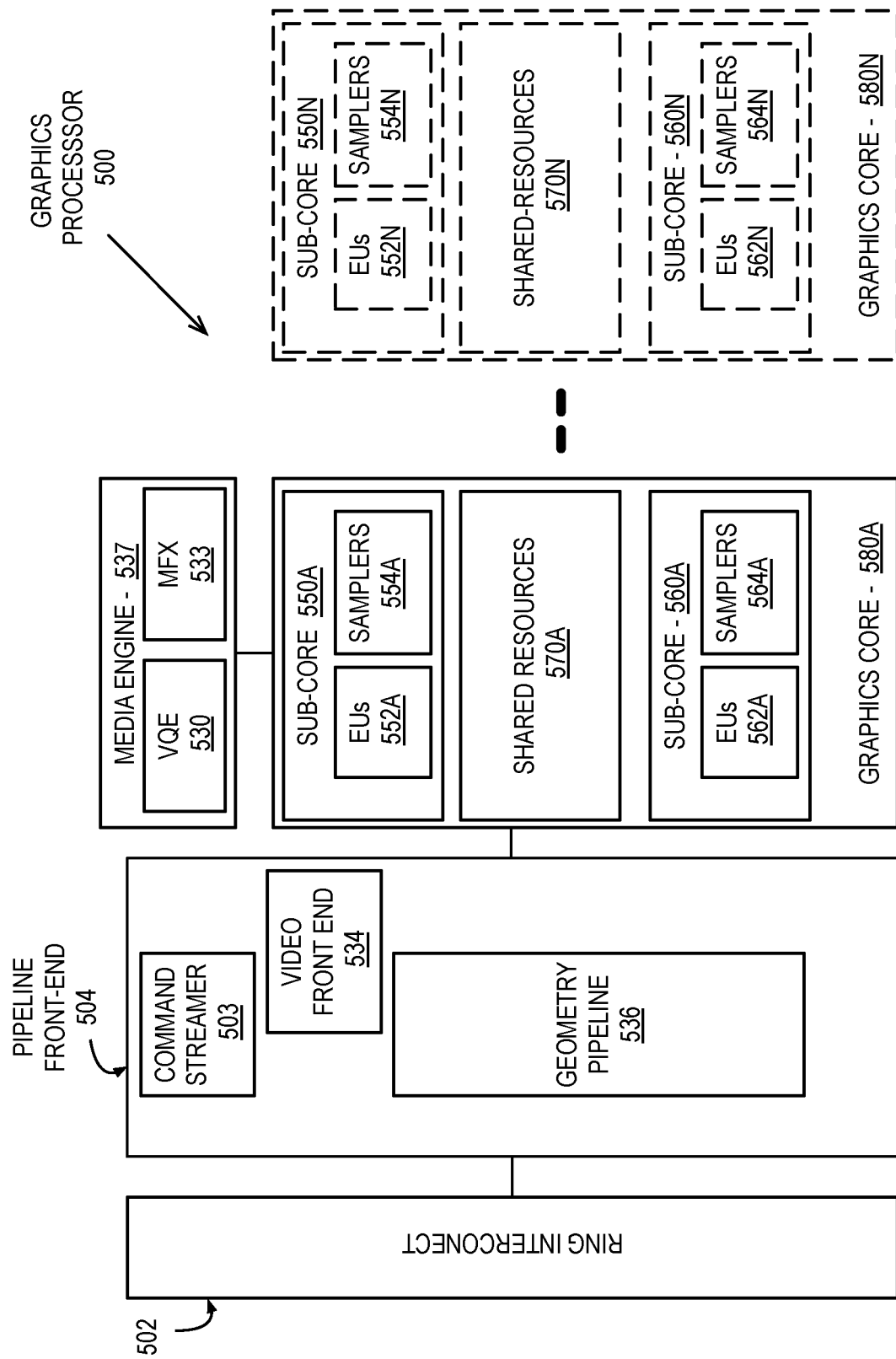
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Execution Units

Figure 6:
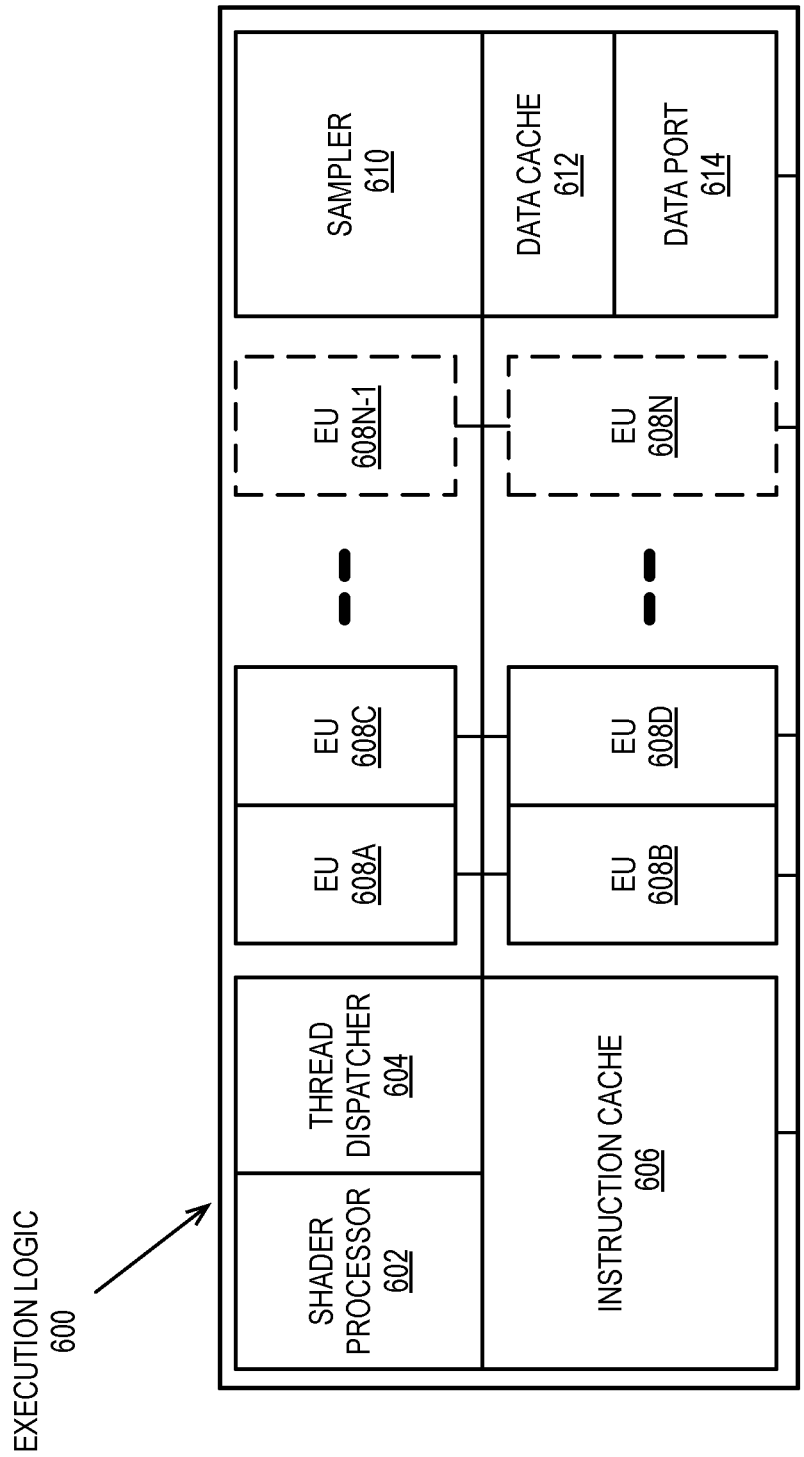
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a shader processor 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution units 608A-608N. In some embodiments, each execution unit (e.g. 608A) is a stand-alone programmable general purpose computational unit that is capable of executing multiple simultaneous hardware threads while processing multiple data elements in parallel for each thread. In various embodiments, the array of execution units 608A-608N is scalable to include any number individual execution units.

In some embodiments, the execution units 608A-608N are primarily used to execute shader programs. A shader processor 602 can process the various shader programs and dispatch execution threads associated with the shader programs via a thread dispatcher 604. In one embodiment the thread dispatcher includes logic to arbitrate thread initiation requests from the graphics and media pipelines and instantiate the requested threads on one or more execution unit in the execution units 608A-608N. For example, the geometry pipeline (e.g., 536 of FIG. 5) can dispatch vertex, tessellation, or geometry shaders to the thread execution logic 600 (FIG. 6) for processing. In some embodiments, thread dispatcher 604 can also process runtime thread spawning requests from the executing shader programs.

In some embodiments, the execution units 608A-608N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 608A-608N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 608A-608N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, a sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. Once a group of geometric objects has been processed and rasterized into pixel data, pixel processor logic (e.g., pixel shader logic, fragment shader logic, etc.) within the shader processor 602 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 602 then executes an application programming interface (API)-supplied pixel or fragment shader program. To execute the shader program, the shader processor 602 dispatches threads to an execution unit (e.g., 608A) via thread dispatcher 604. In some embodiments, pixel shader 602 uses texture sampling logic in the sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 7:
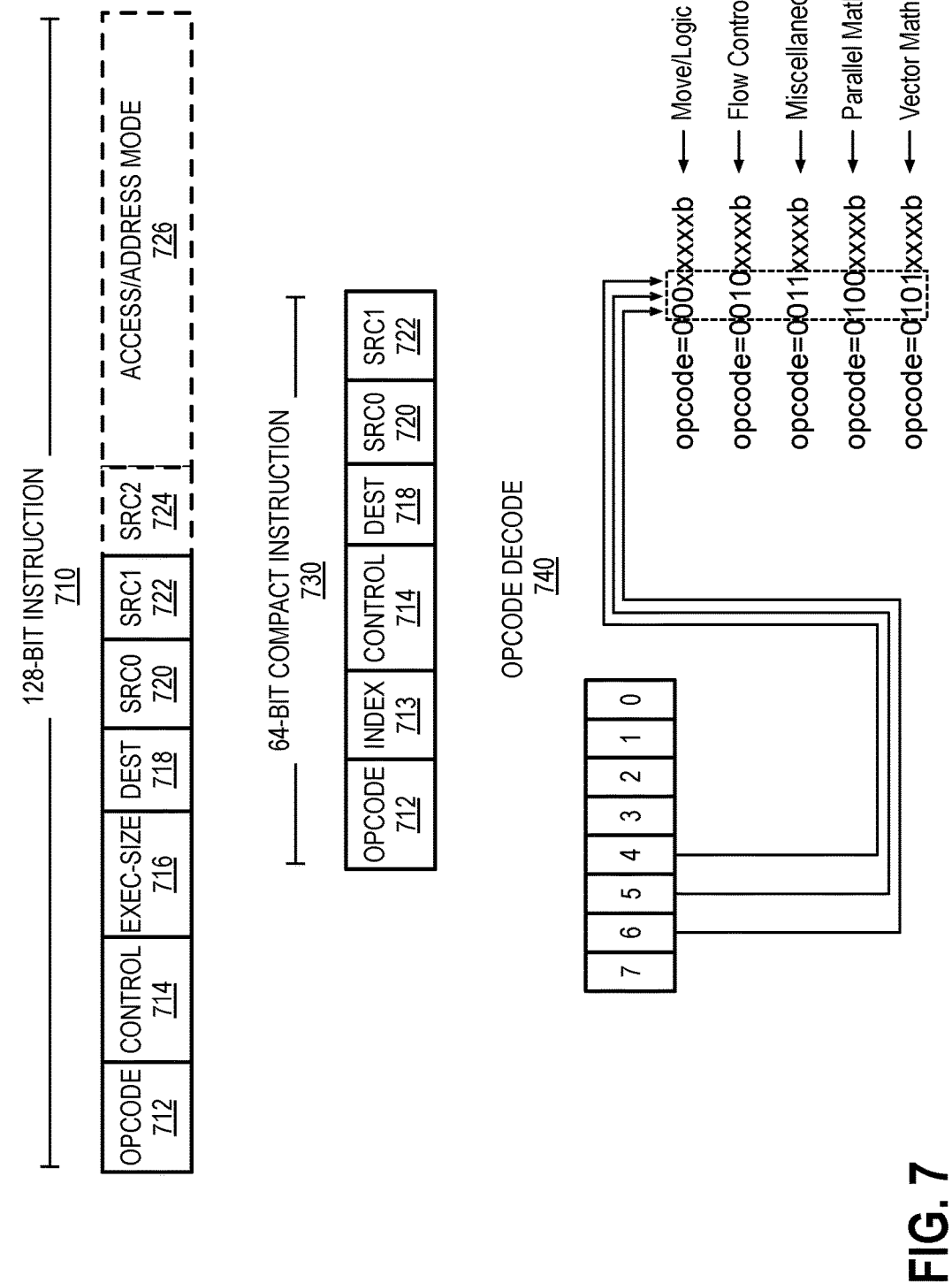
FIG. 7 illustrates a graphics processor execution unit instruction format according to an embodiment.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40).

The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
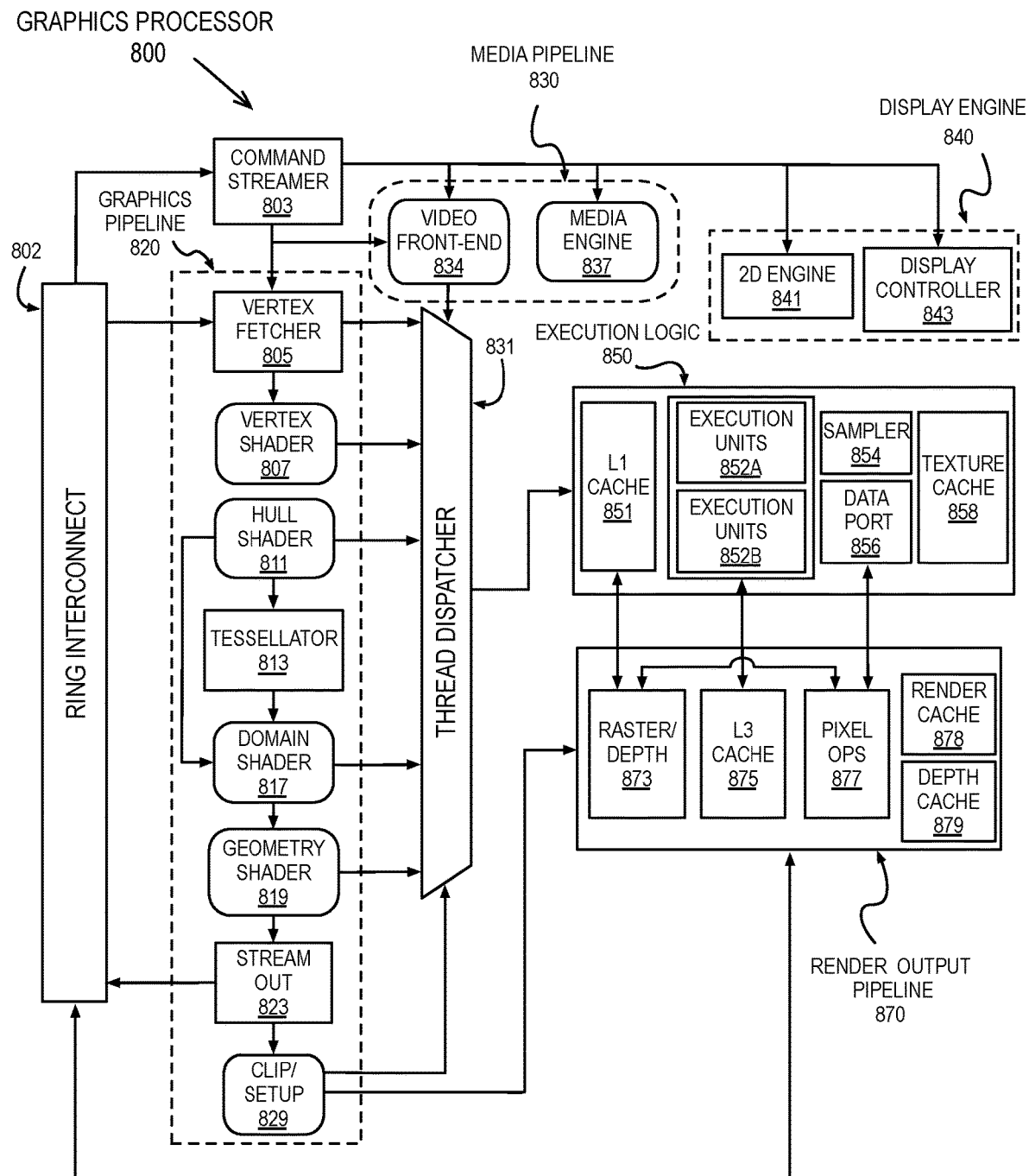
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9A:
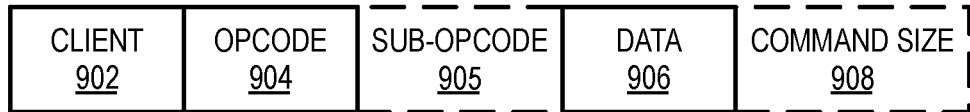
FIG. 9A is a block diagram illustrating a graphics processor command format according to an embodiment.
Figure 9B:
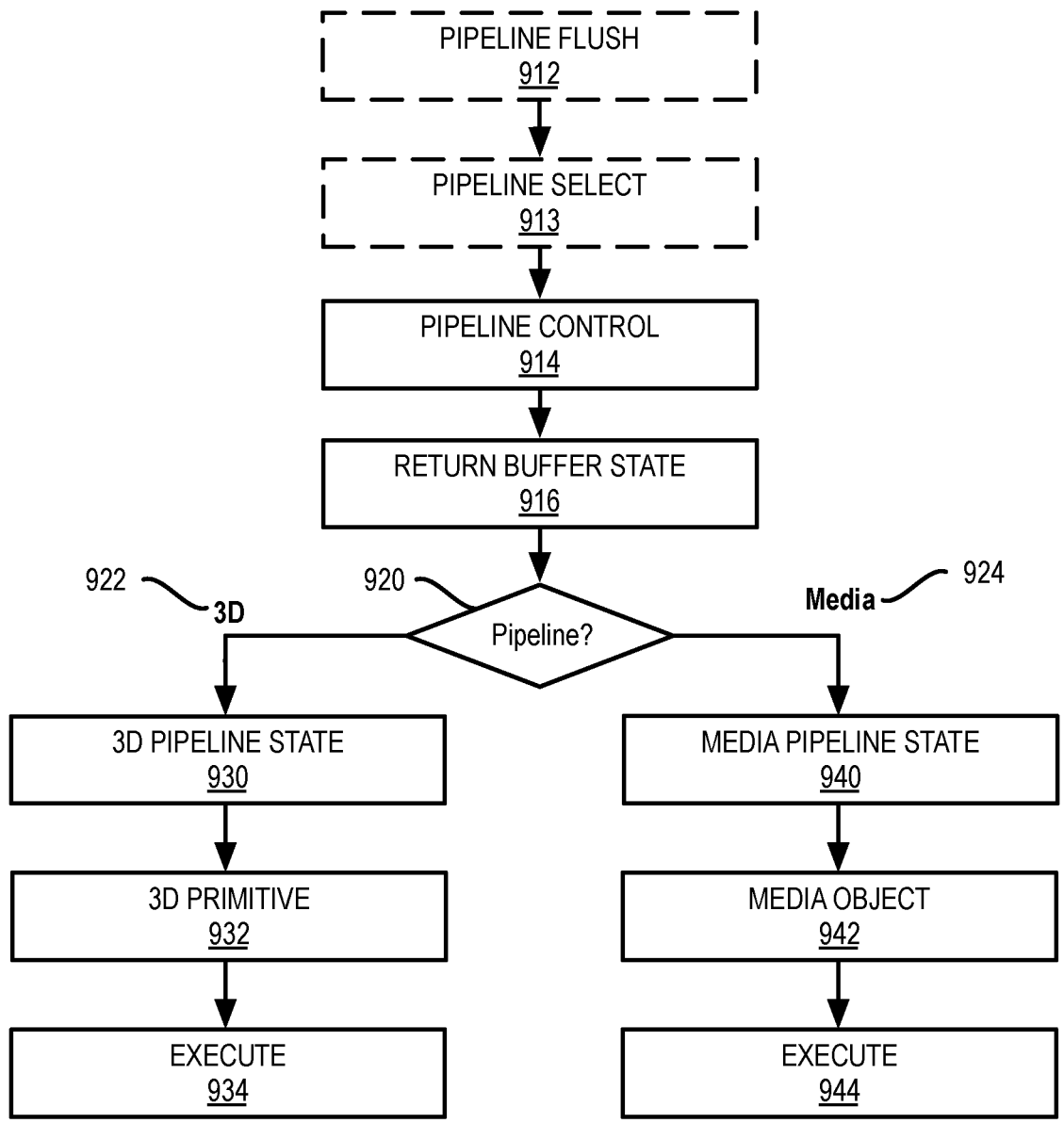
FIG. 9B is a block diagram illustrating a graphics processor command sequence according to an embodiment.

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
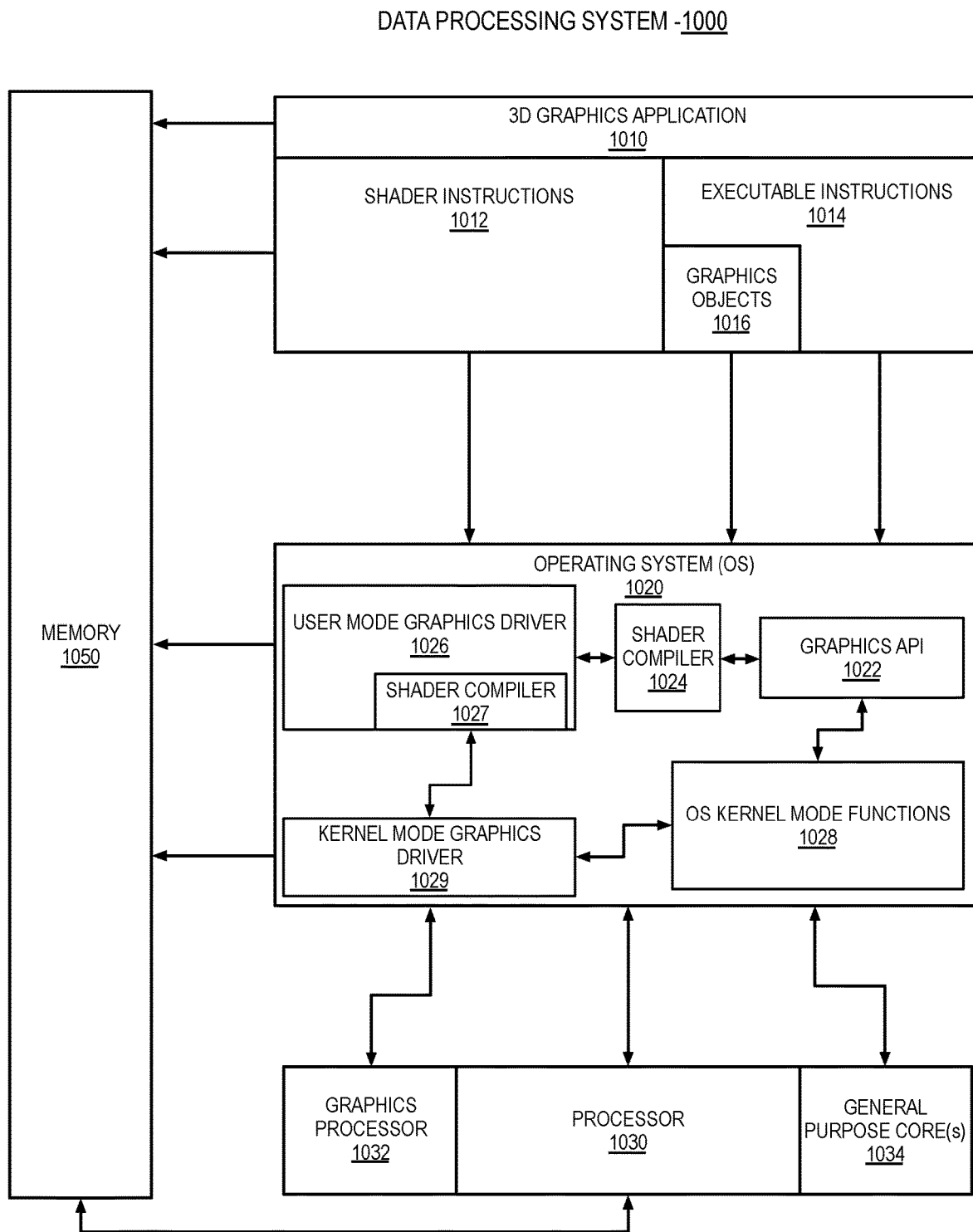
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
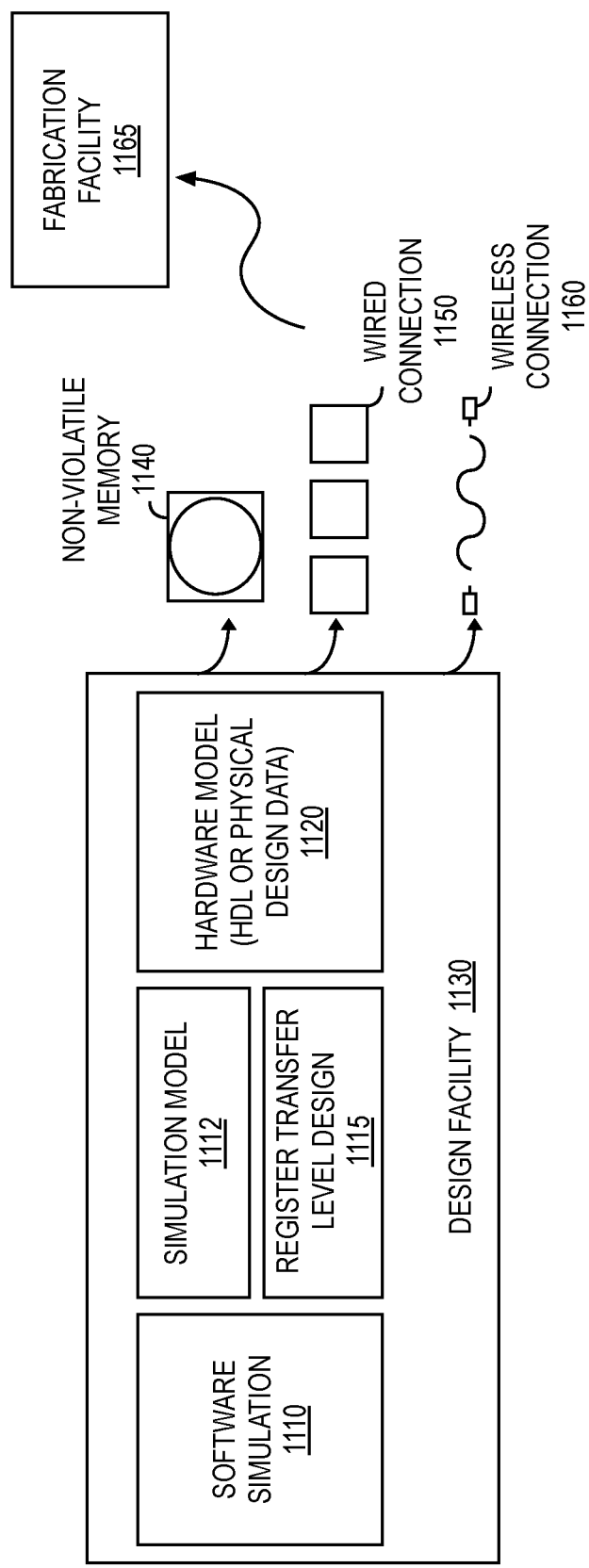
FIG. 11 is a block diagram illustrating an IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Exemplary System on a Chip Integrated Circuits

Figure 12:
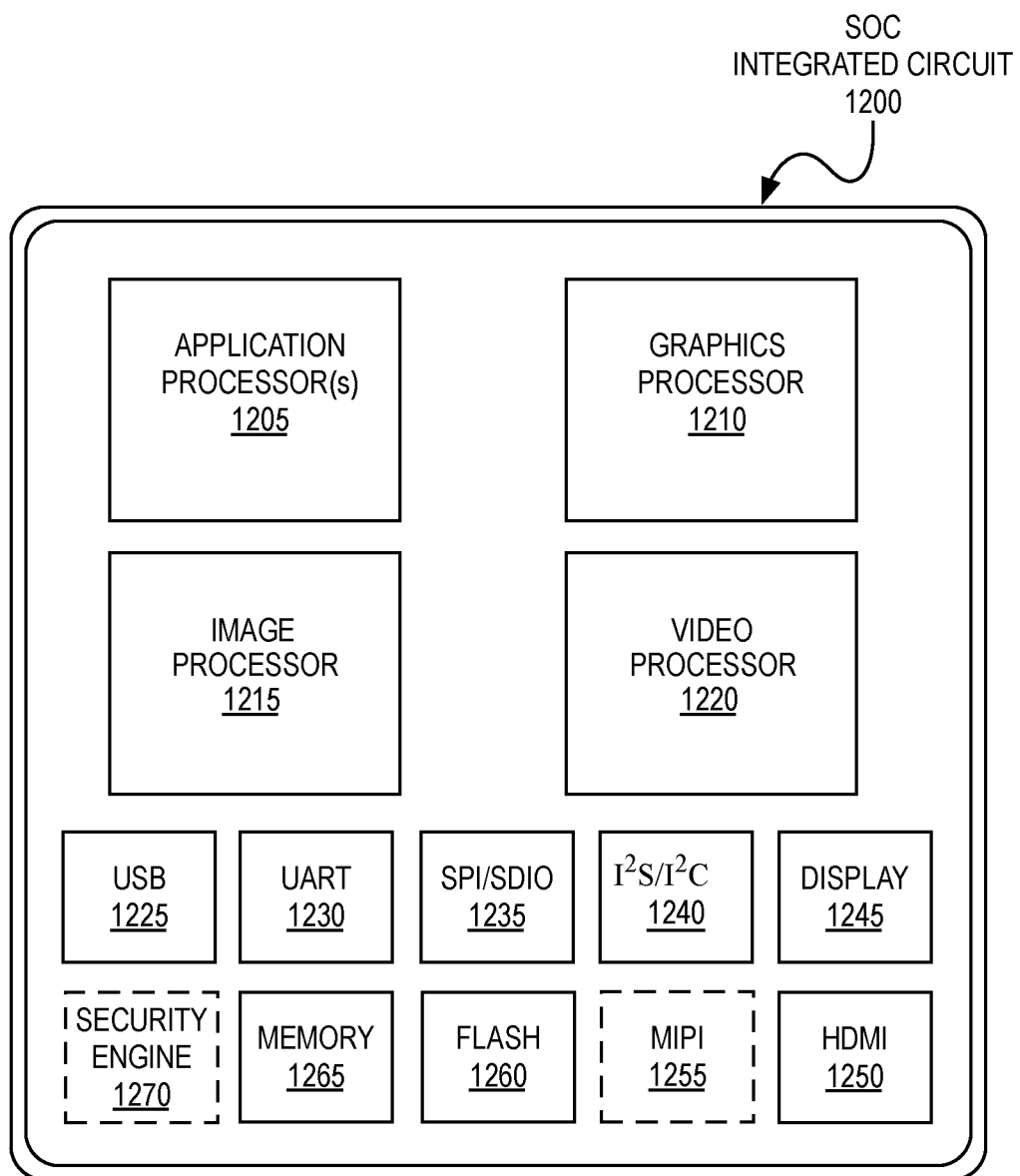
FIG. 12 is a block diagram illustrating an exemplary system on a chip integrated circuit that may be fabricated using one or more IP cores, according to an embodiment.
Figure 13:
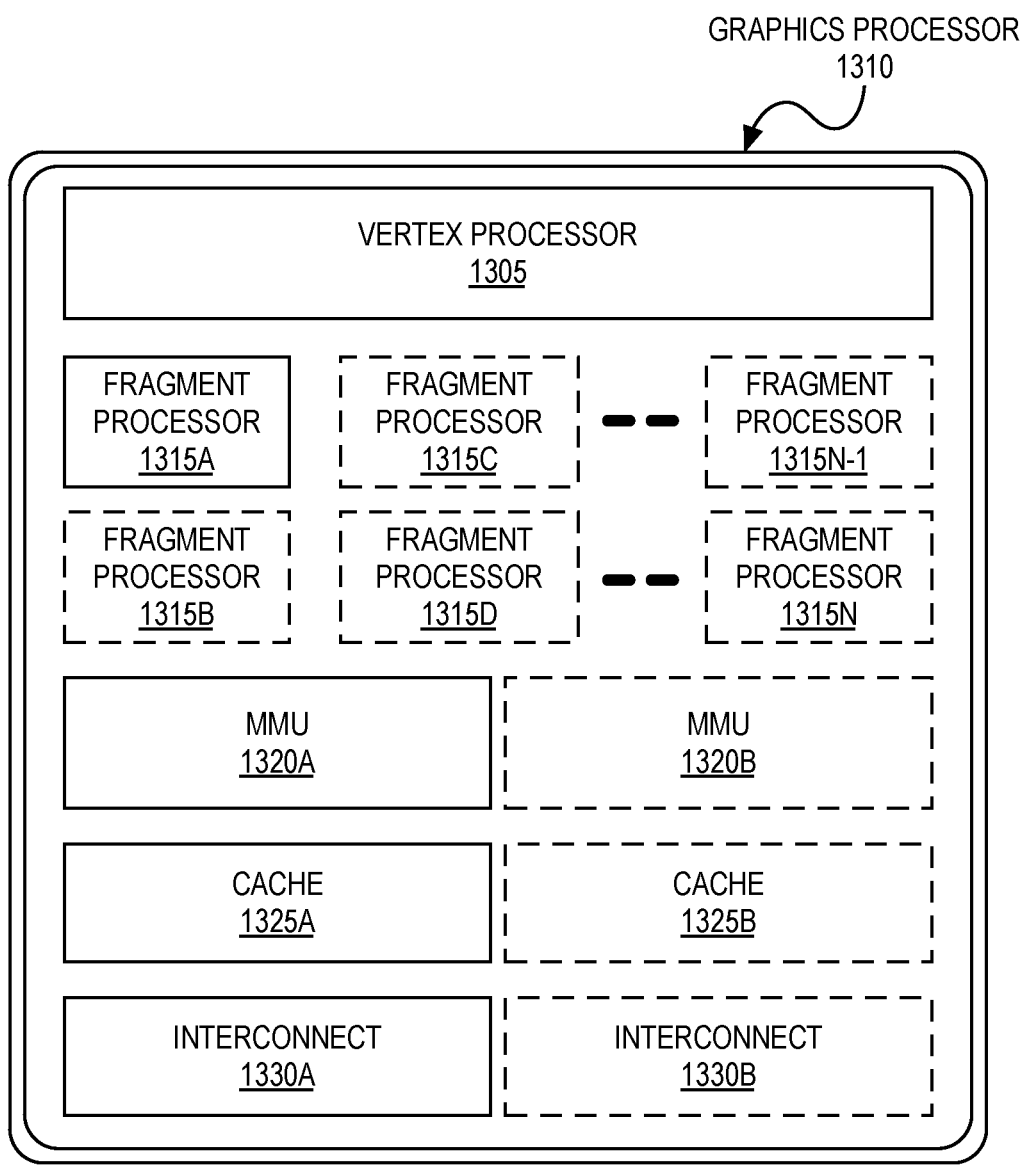
FIG. 13 is a block diagram illustrating an exemplary graphics processor of a system on a chip integrated circuit.
Figure 14:
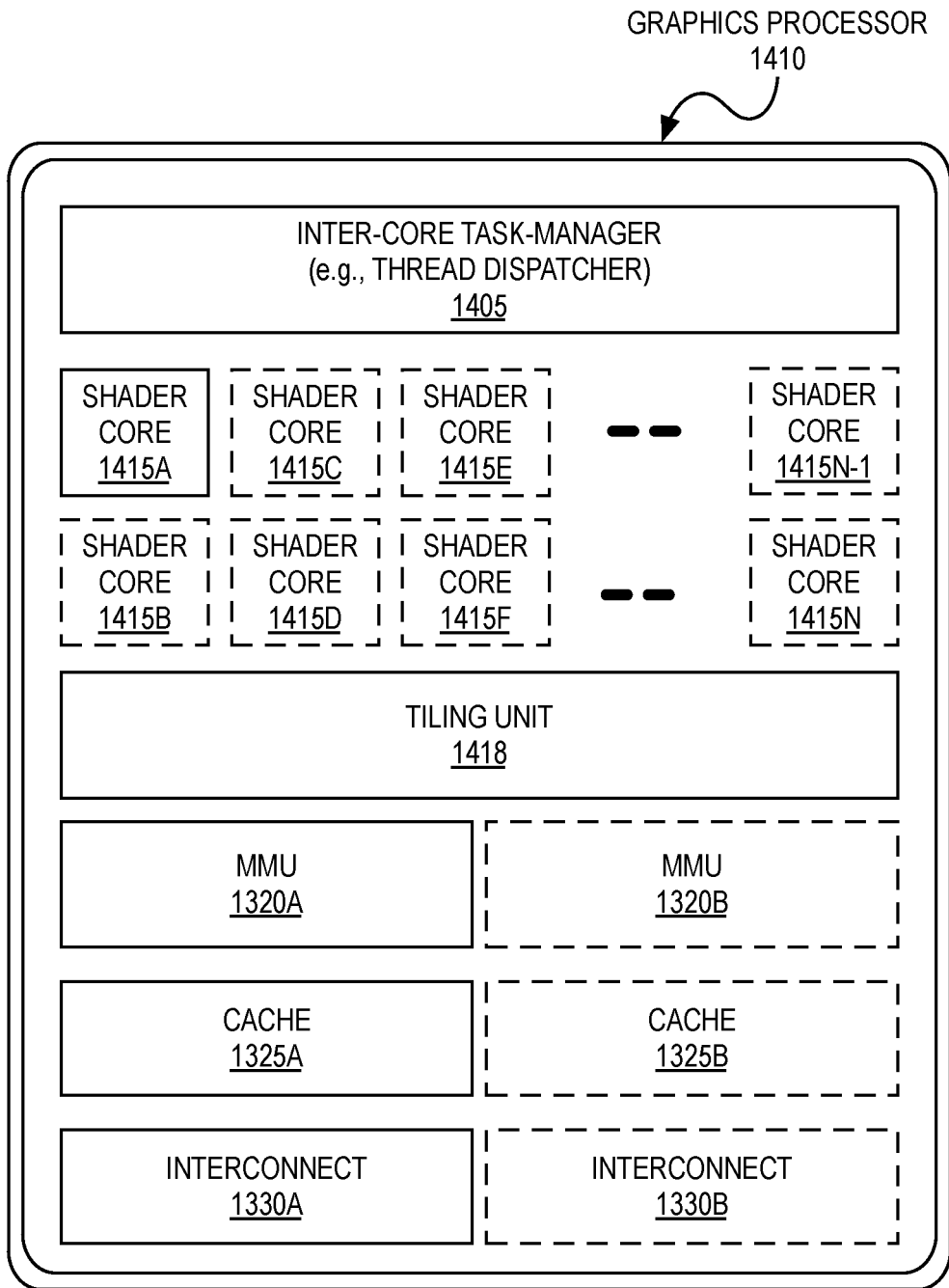
FIG. 14 is a block diagram illustrating an additional exemplary graphics processor of a system on a chip integrated circuit.

FIG. 12-14 illustrated exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I²S/I²C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

FIG. 13 is an block diagram illustrating an exemplary graphics processor 1310 of a system on a chip integrated circuit that may be fabricated using one or more IP cores, according to an embodiment. Graphics processor 1310 can be a variant of the graphics processor 1210 of FIG. 12. Graphics processor 1310 includes a vertex processor 1305 and one or more fragment processor(s) 1315A-1315N. Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for integrated circuit 1300, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1325A-1325B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

FIG. 14 is a block diagram illustrating an additional exemplary graphics processor 1410 of a system on a chip integrated circuit that may be fabricated using one or more IP cores, according to an embodiment. Graphics processor 1410 can be a variant of the graphics processor 1210 of FIG. 12. Graphics processor 1410 includes the one or more MMU(s) 1320A-1320B, caches 1325A-1325B, and circuit interconnects 1330A-1330B of the integrated circuit 1300 of FIG. 13.

Graphics processor 1410 includes one or more shader core(s) 1415A-1415N, which provides for a unified shader core architecture in which a single core or type or core can execute all types of programmable shader code, including vertex shaders, fragment shaders, and compute shaders. The exact number of shader cores present can vary among embodiments and implementations. Additionally, graphics processor 1410 includes an inter-core task manager 1405, which acts as a thread dispatcher to dispatch execution threads to one or more shader cores 1415A-1415N and a tiling unit 1418 to accelerate tiling operations for tile-based rendering, in which rendering operations for a scene are subdivided in image space, for example to exploit local spatial coherence within a scene or to optimize use of internal caches.

Divergent Control Flow for Fused EUs

Figure 15:
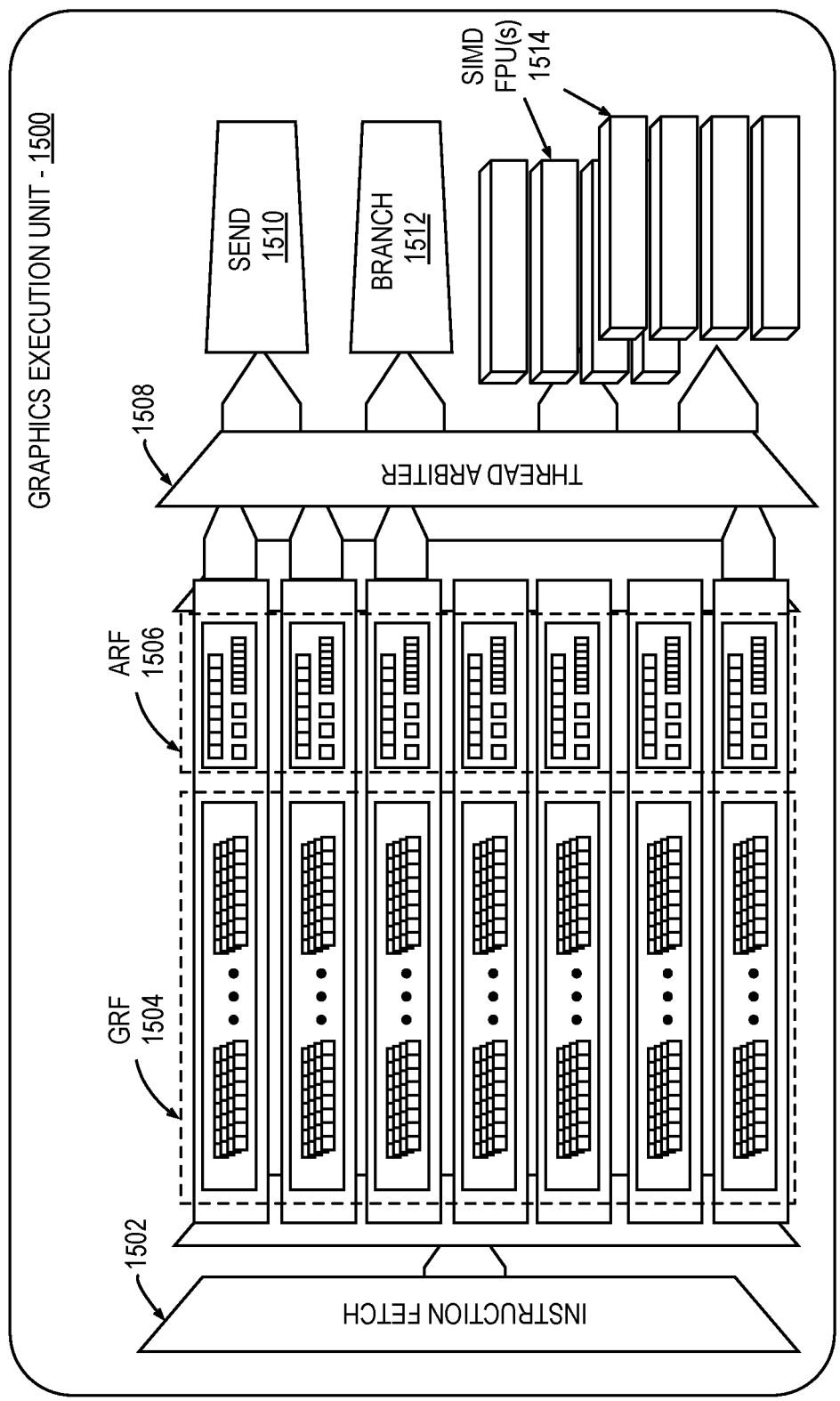
FIG. 15 is a block diagram of thread execution logic within a graphics processor, according to an embodiment.
Figure 16:
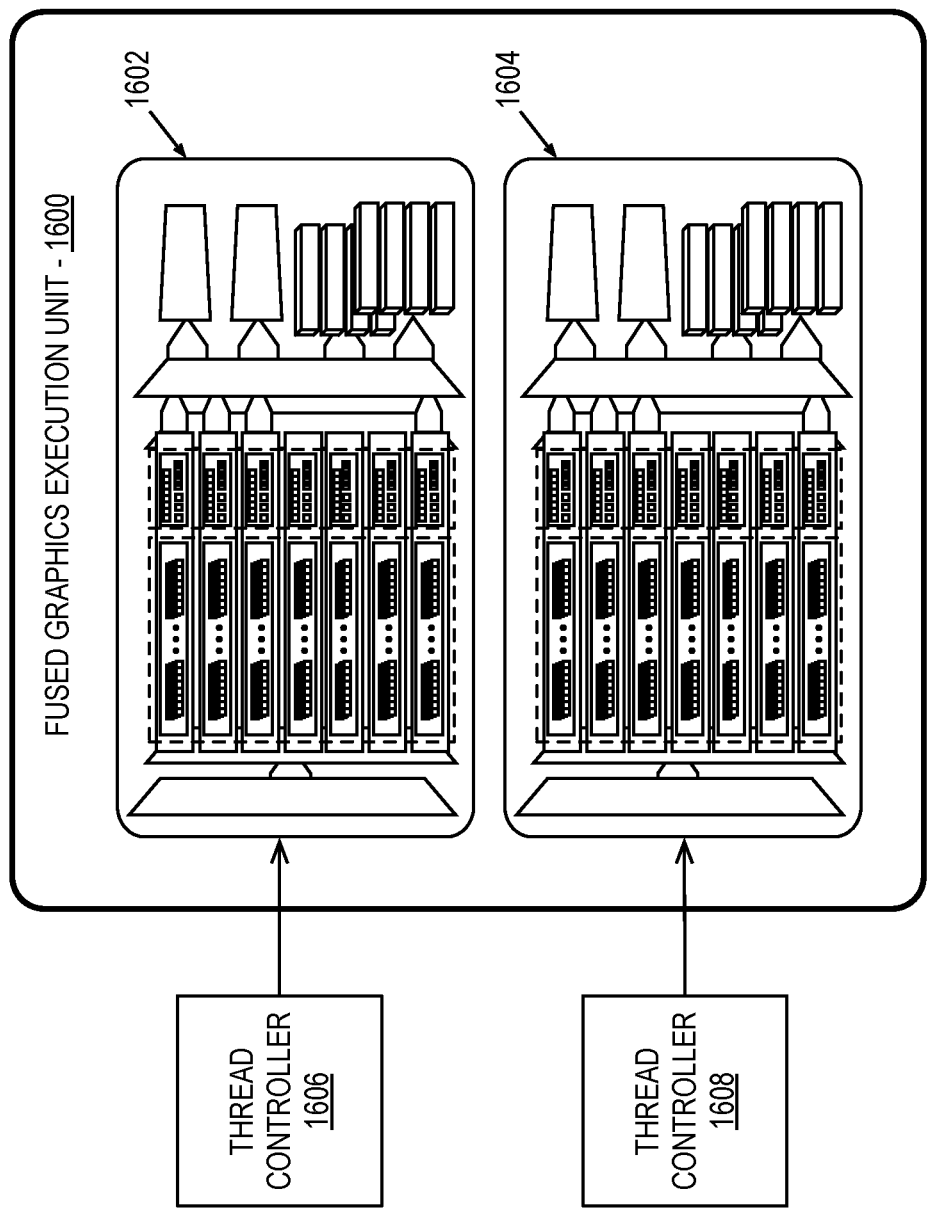
FIG. 16 is an illustration of a fused graphics execution unit, according to an embodiment.

Embodiments provide for a graphics architecture including fused execution units (EUs) with support for divergent calls. Support of divergent SIMD calls is of particular application when compiling program code from languages that support polymorphism, such as, for example, the C++ programming language, for execution on a graphics processor as described herein. One embodiment provides support via a hardware solution. Other embodiments provide support via a combination of hardware and software logic. In the figures below, FIG. 15 illustrates exemplary logic thread execution logic associated with a graphics processor EU. FIG. 16 illustrates an exemplary fused EU.

Exemplary Graphic Processor Thread Execution Logic

FIG. 15 is a block diagram of thread execution logic within a graphics processor, according to an embodiment. In one embodiment the thread execution logic of the graphics processor is included within a graphics execution unit 1500. Multiple graphics execution units 1500 can be included within each graphics processor or graphics processor core. In one embodiment, the graphics execution unit 1500 includes an instruction fetch unit 1502, a general register file array (GRF) 1504, an architectural register file array (ARF) 1506, a thread arbiter 1508, a send unit 1510, a branch unit 1512, and a set of SIMD floating point units (FPUs) 1514. The GRF 1504 and ARF 1506 includes the set of general register files and architecture register files associated with each simultaneous hardware thread that may be active in the graphics execution unit 1500. In one embodiment, per thread architectural state is maintained in the ARF 1506, while data used during thread execution is stored in the GRF 1504. The execution state of each thread, including the instruction pointers for each thread, can be held in thread-specific registers in the ARF 1506.

In one embodiment the graphics execution unit 1500 has an architecture that is a combination of Simultaneous Multi-Threading (SMT) and fine-grained Interleaved Multi-Threading (IMT). The architecture has a modular configuration that can be fine tuned at design time based on a target number of simultaneous threads and number of registers per execution unit, where execution unit resources are divided across logic used to execute multiple simultaneous threads.

In one embodiment, the graphics execution unit 1500 can co-issue multiple instructions, which may each be different instructions. The thread arbiter 1508 of the graphics execution unit thread 1500 can dispatch the instructions to one of the send 1510, branch 1512, or SIMD FPU(s) 1514 for execution. Each execution thread can access 128 general-purpose registers within the GRF 1504, where each register can store 32 bytes, accessible as a SIMD 8-element vector of 32-bit data elements. In one embodiment, each execution unit thread has access to 4 Kbytes within the GRF 1504, although embodiments are not so limited, and greater or fewer register resources may be provided in other embodiments. In one embodiment up to seven threads can execute simultaneously, although the number of threads per execution unit can also vary according to embodiments. In an embodiment in which seven threads may access 4 Kbytes, the GRF 1504 can store a total of 28 Kbytes. Flexible addressing modes can permit registers to be addressed together to build effectively wider registers or to represent strided rectangular block data structures.

In one embodiment, memory operations, sampler operations, and other longer-latency system communications are dispatched via "send" instructions that are executed by the message passing send unit 1510. In one embodiment, branch instructions are dispatched to a dedicated branch unit 1512 to facilitate SIMD divergence and eventual convergence.

In one embodiment the graphics execution unit 1500 includes one or more SIMD floating point units (FPU(s)) 1514 to perform floating-point operations. In one embodiment, the FPU(s) 1514 also support integer computation. In one embodiment the FPU(s) 1514 can SIMD execute up to four 32-bit floating-point (or integer) operations, or SIMD execute up to eight 16-bit integer or 16-bit floating-point operations. In one embodiment, at least one of the FPU(s) provides extended math capability to support high-throughput transcendental math functions and double precision 64-bit floating-point.

In one embodiment, arrays of multiple instances of the graphics execution unit 1500 can be instantiated in a graphics sub-core grouping (e.g., a sub-slice). For scalability, product architects can chose the exact number of execution units per sub-core grouping. Exemplary graphics sub-cores are illustrated in FIG. 5, which is discussed above.

In one embodiment the execution unit can execute instructions across a plurality of execution channels. In a further embodiment, each thread executed on the graphics execution unit 1500 is executed on a different channel.

Exemplary Fused Graphics Execution Unit

FIG. 16 is an illustration of a fused graphics execution unit 1600, according to an embodiment. Multiple EUs can be fused into an EU group and each EU in the fused EU group can be configured to execute a separate SIMD hardware thread. The number of EUs in a fused EU group can vary according to embodiments. Additionally, various SIMD widths can be performed per-EU, including but not limited to SIMD8, SIMD16, and SIMD32.

As illustrated in FIG. 16, the fused graphics execution unit 1600 includes a first EU 1602 and a second EU 1604, although support for any number of fused EUs is provided in various embodiments. Thread execution on the fused graphics execution unit 1600 is facilitated by one or more thread controllers (e.g., thread controller 1606 and thread controller 1608), which control threads executed on the fused graphics execution unit 1600. In one embodiment, EU 1602 and EU 1604 can each execute different threads of a program. Although different threads of the same program are executed, all EUs in the fused graphics execution unit 1600 execute in lock-step. Accordingly, a single instruction pointer (% ip) register is shared by EU 1602 and EU 1604.

Sharing an instruction pointer register can be a challenge when trying to execute a call instruction lowered from a virtual function call in program source, as different program flows can have different call targets. Accordingly, extra support may be required in hardware and/or software when executing a call instruction with divergent control flow, such that different channels have different targets. Code having divergent control flow is typically a result of compiler lowering virtual function calls from a language like C++ to SIMD machine code targeting a graphics processor as described herein.

Figure 17:
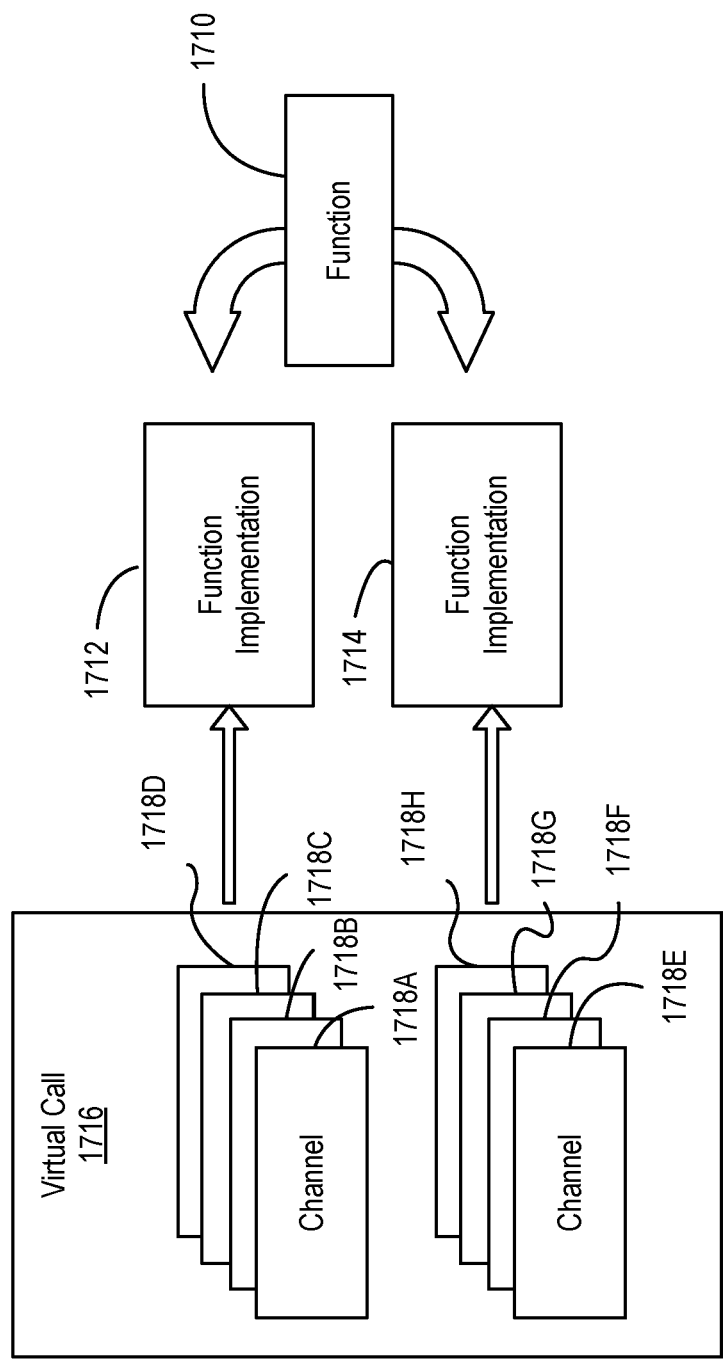
FIG. 17 illustrates a SIMS environment in which a virtual call from executing code invokes multiple implementations of a function.

FIG. 17 illustrates a SIMD environment in which a virtual call 1716 from executing code invokes multiple implementations of a function 1710 and the invocations are not determined until runtime. In the illustrated example, the function 1710 is used in a first implementation 1712 and a second implementation 1714. In particular, the virtual call 1716 may include multiple channels 1718 (1718A. 1718B, 1718O, 1718D, 1718E, 1718F, 1718G, 1718H) that invoke the function implementations 1712, 1714. In the illustrated example, a first subset of channels 1718A-1718D invoke the first implementation 1712 of the function 1710, and a second subset of channels 1718E-1718H invoke the second implementation 14 of the function 10. Thus, the virtual call 1716 may be represented by C++ code sequence of Code Sequence 1.

Code Sequence 1 - C++ Logic Including a Virtual Call

```
Class A {
  virtual void foo( ) {...} //A implementation
}
Class B : public A {
  virtual void foo( ) {...} // B implementation
}
int main( ) {
  A*obj;
  ...
  obj->foo( ); // may call either A::foo or B::foo
}
```

In the exemplary code sequence above, "foo" is the function 1710, "A implementation" is the first implementation 1712, "B implementation" is the second implementation 1714 (and a subclass of the first implementation), and the variable "obj" is a channel-based vector variable. For example, if an eight channel SIMD (SIMD8) environment is deployed, there may be eight concurrent program flows and one instruction that operates on eight-element vectors. In this situation, the variable "obj" could be an eight-channel vector variable, and each channel 1718 in the virtual call 1716 may invoke either A's or B's implementation of the function foo( ). A single dispatch of the function 1710 may be used to invoke the virtual call 1716 for two or more of the channels 1718. For example, one dispatch of the function 1710 could be used to invoke the virtual call 1716 for the first subset of channels 1718A-1718D, and another dispatch of the function 1710 might be used to invoke the virtual call 1716 for the second subset of channels 1718E-1718H.

Figure 18:
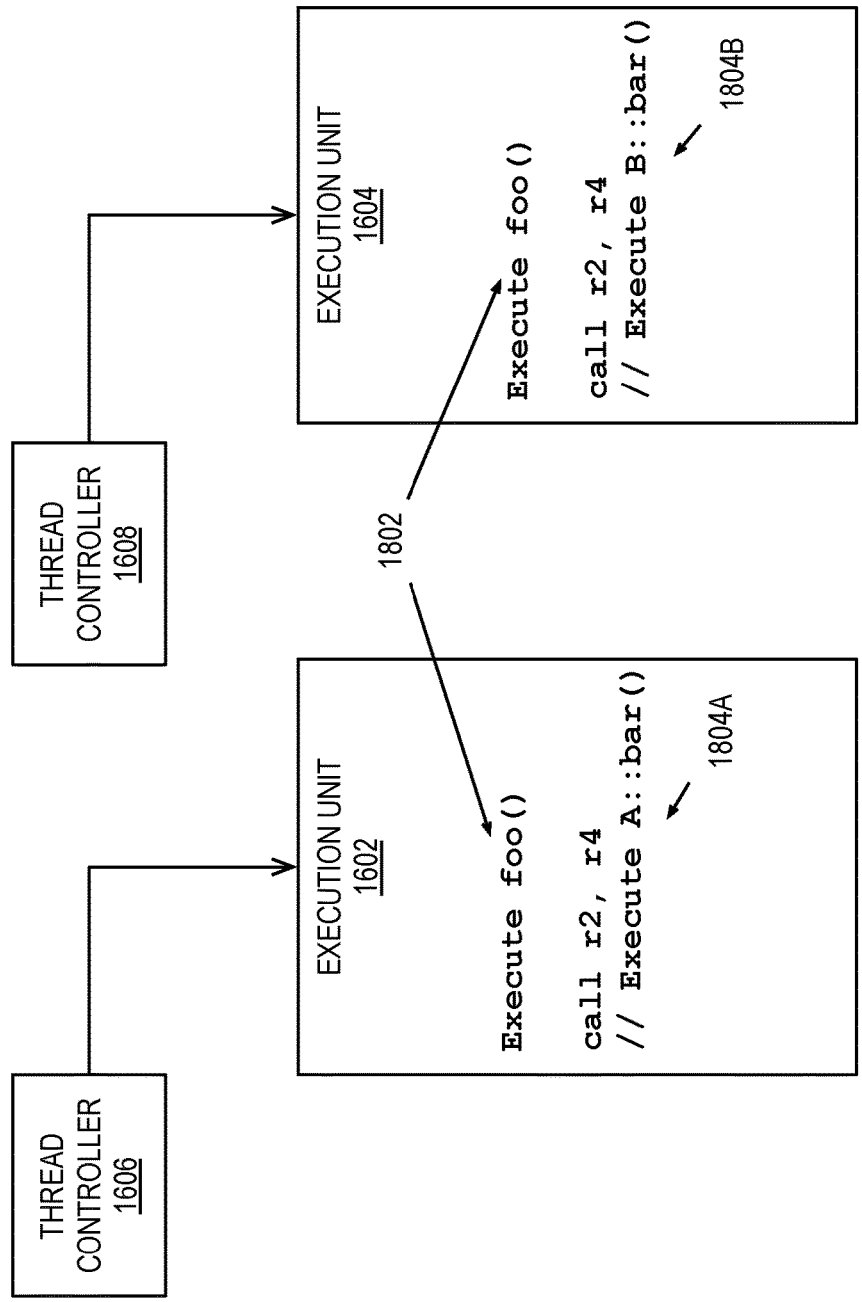
FIG. 18 illustrates call divergence on a fused EU, which can occur when executing virtual call.

FIG. 18 illustrates call divergence on a fused EU, which can occur when executing virtual call. Execution unit 1602 and execution unit 1604 of the fused graphics execution unit 1600 of FIG. 16 can execute a call instruction at the same instruction pointer of a program (e.g., Execute foo( ) 1802). However, the call instruction of the program 1802 may resolve to different targets, where execution unit 1602 is to call to a first target (e.g., A::bar( ) 1802A), while execution unit 1604 is to call to a second target (e.g., B::bar (1804B). Because the calls of the same program have different targets on the different execution units, a divergence in the code flow has occurred.

Under such conditions, it may be nontrivial to choose next instruction pointer such that the execution can continue to be in lock-step for both execution unit 1602 and execution unit 1604. For example and in one embodiment, each execution unit in the fused execution unit group has visibility to its own call target register but does not have visibility into the call target of other execution units of the group. Accordingly, the execution units cannot set the proper execution masks for the respective arithmetic logic units (ALUs).

Embodiments described herein provide techniques to efficiently handle divergent control flow within a group of fused execution units. One embodiment provides for a hardware only solution. One embodiment provides for a software solution requiring minimal hardware support. A further embodiment provides a combined hardware and software solution. In one implementation of the embodiments, compiler support is included to determine whether a call is potentially divergent. If the compiler determines that a call can result in divergence in control flow, then the compiler can serialize execution of the call on a per-EU basis. In one embodiment, serialization can be performed by enabling only one EU in a fused EU group when executing a potentially divergent call instruction.

Embodiments described in the instant specification describes solutions in which call targets are uniform within an EU, but divergent across EUs of a fused EU. For example, a single execution unit of a fused execution unit can be configured to execute multiple threads, where each thread has a separate instruction pointer, and corresponding threads across EUs of the fused EU share an instruction pointer. However, it is also possible that call targets per enabled thread within an EU may be divergent, which requires serialization of divergent SIMD channels within a single EU. To generate optimized code for divergent calls within an EU of a fused EU, reference is made to application Ser. No. 13/028,574 for Enabling Virtual Calls in a SIMD Environment, filed Feb. 16, 2011, now issued as U.S. Pat. No. 9,183,014, which is hereby incorporated herein by reference.

One embodiment provides for a graphics processor including hardware supported divergent calls for a fused EU. In such embodiment, hardware scans the target of all channels of call instruction at the current instruction pointer and automatically serializes instruction execution.

Hardware Supported Divergent Calls for a Fused EU

Figure 19:
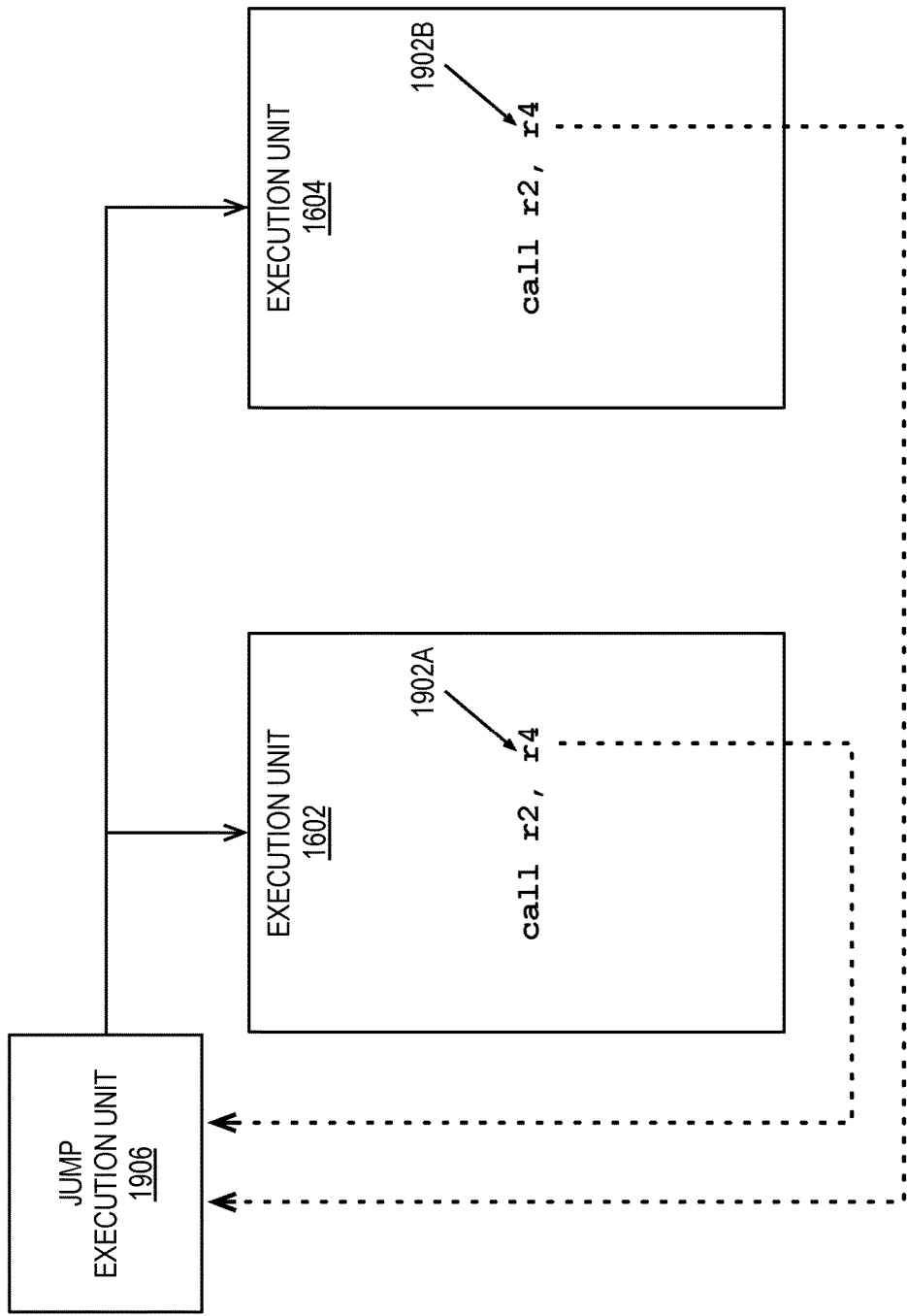
FIG. 19 is a block diagram of fused EU with hardware support for divergent calls, according to an embodiment.

FIG. 19 is a block diagram of fused EU 1900 with hardware support for divergent calls, according to an embodiment. The fused EU can include execution unit 1602 and execution unit 1604 as previously described. The execution units can execute a call having divergent control flow using hardware logic to automatically serialize divergent calls. Execution unit 1602 and execution unit 1604 can each couple with a branch execution unit 1906. In one embodiment, the jump execution unit 1906 is a portion of the branch unit 1512 of FIG. 15. As each EU executes in lock-step, in one embedment a fused EU can have shared or combined branch unit logic.

The hardware logic to support control flow divergence on function calls, in one embodiment, can reside within the jump execution unit 1906, although embodiments are not so limited. The hardware logic can include comparison logic to compare the targets associated with a first call 1902A on execution unit 1602 and a second call 19028 on execution unit 1604, and is further illustrated in FIG. 19.

In one embodiment, comparison logic is used to compare the target of all channels of execution for execution unit 1602 and execution unit 1604. If all channels of both execution units have a common target then the jump execution unit 1906 can set the shared instruction pointer to the common call target. In the event the call targets are not same across execution units, then the comparison logic can create groups of channels such that each group includes channels having same call target. Execution unit 1602 and execution unit 1604 can then be configured for serialized group execution, with alternate groups enabled or disabled during one or more cycles of execution. Once all groups have completed execution, the comparison logic can re-enable all channels and proceed beyond call instruction.

Figure 20:
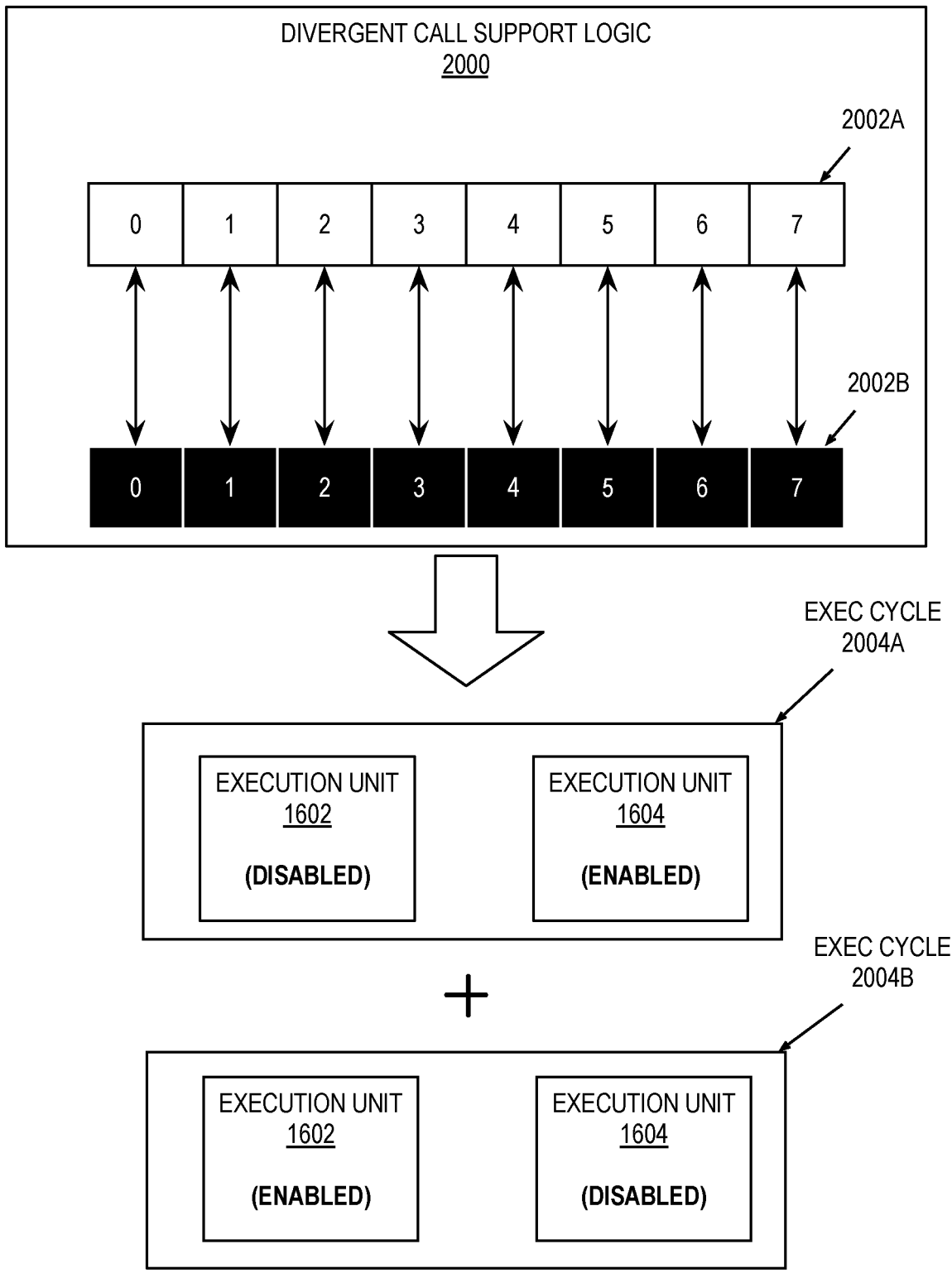
FIG. 20 is a block diagram of divergent call support logic, according to an embodiment.

FIG. 20 is a block diagram of divergent call support logic 2000, according to an embodiment. In one embodiment, the divergent call support logic 2000 has visibility into execution channels across each execution units. Where a first set of channels 2002A has a first call target and a second set of channels 2002B has a second call target, the divergence call support logic 2000 can group channels and isolate the different channel groups to different execution units. Execution of the different channel groups can be serialized. For example, in a first execution cycle 2004A, execution unit 1802 can be disabled, while execution unit 1804 executes a first group of channels. In a second execution cycle 2004B, execution unit 1802 can be enabled to execute a second group of channels, while execution unit 1804 is disabled.

In one embodiment, hardware based divergent call support logic 2000 can crate groups of channels across multiple execution units, enabling improved performance relative to software based solutions that may not be able to group channels across execution units of the fused EU 1900. For example, the support logic 2000 can group all execution channels having the same call target, even if those channels reside in multiple execution units. EUs having enabled execution channels can execute instructions at a first call target while instruction channels associated with alternate call targets are disabled. During serial execution of the channel groups, any EU having no enabled channels may be disabled.

The downside provided by a hardware only support is the additional hardware logic used to compare the target of all channels of execution, as well as the logic to enable or disable execution units based on the call target. Accordingly, implementations including hardware support may be focused on graphics processors heavily tailored to heterogeneous compute use cases in which the use of virtual calls can result in control flow divergence as illustrated.

EU-Exec Register to Enable Support for Call Divergence

One embodiment provides for a combined hardware/ software logic to support divergent calls in a fused EU. The combined hardware/software logic includes a read/write architecture register (EU-exec), with a value that determines the gating of each EU in a fused EU. In one embedment the EU-exec architecture register is a 2-bit wide bit-mask that supports two fused EUs, although the register is a wider register in other embodiments, such as a 3-bit wide register to support the fused EUs. In general, to support n fused EUs per set, the EU-exec register is n-bits wide. The EU-exec architecture register, in one embodiment, resides in an architectural register file array (ARF), such ARF 1506 of FIG. 15.

In one embodiment a mov (move) instruction provided by the instruction set of the EU can be used to initialize the value of the EU-exec. Compiler logic can be configured to insert initialization logic to configure the EU-exec register. The enable/disable logic of the EU-exec register is shown in Table 1 below.

TABLE 1

EU-exec register control logic bitmask for EU gating

| EU-exec value | EU0 gating | EU1 gating |
|---|---|---|
| 0x0 | Enabled | Enabled |
| 0x1 | Enabled | Disabled |
| 0x2 | Disabled | Enabled |

As shown in table above, when EU-exec value is 0x0, i.e., default value, all fused EUs (e.g., EU0, EU1 as in Table 1) will be enabled. With the EU-exec register set to 0x1, only EU0 is enabled. While, EU0 and EU1 will use same instruction pointer register, EU1 instruction execution is gated off irrespective of the execution mask of the instruction at the instruction pointer. Similarly, when EU-exec is set to 0x2, EU1 is enabled and EU0 is gated off. Only enabled EUs will execute instructions and commit results. The disabled EUs will not execute instructions or commit results.

Figure 21:
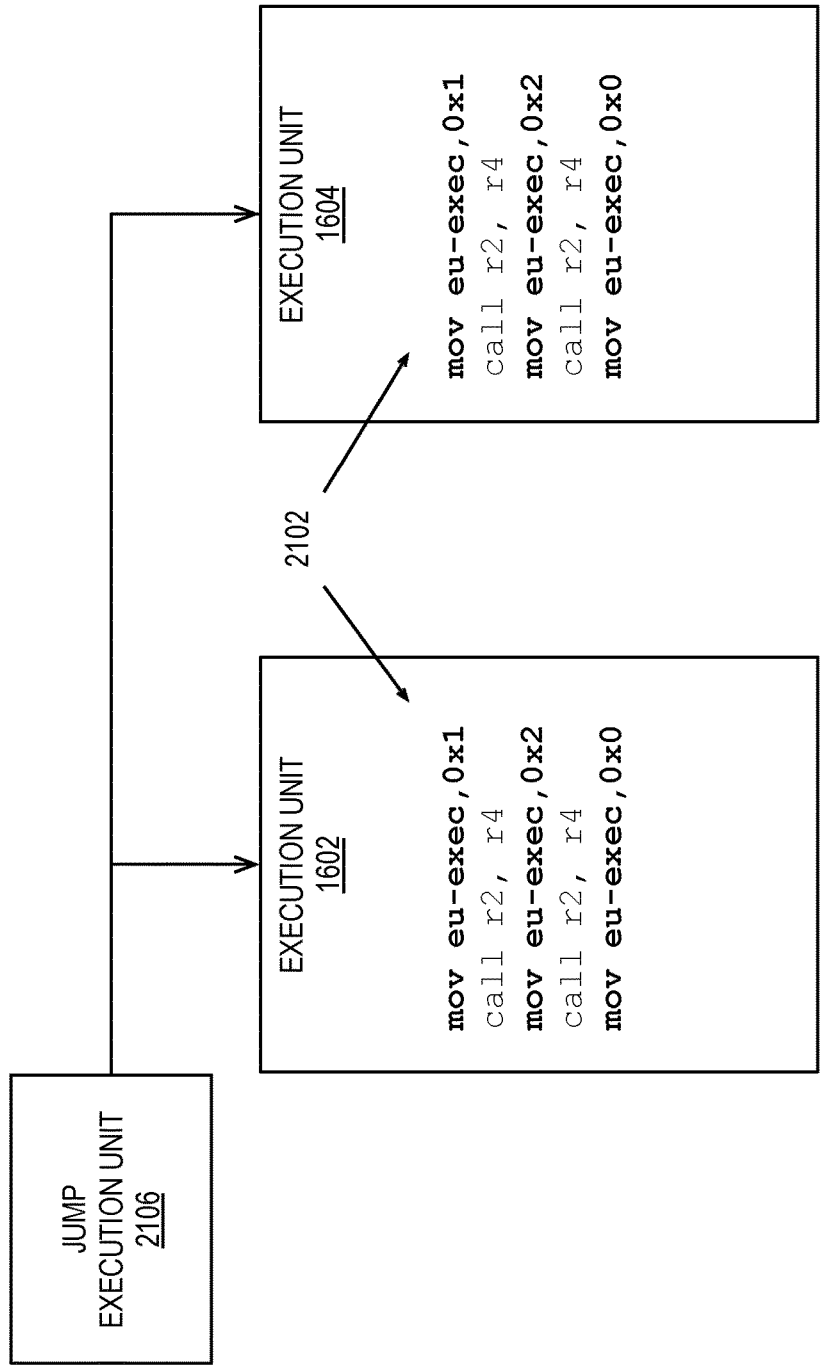
FIG. 21 illustrates combined hardware/software logic to support divergent calls in a fused EU, according to an embodiment.

FIG. 21 illustrates combined hardware/software logic 2100 to support divergent calls in a fused EU, according to an embodiment. The combined hardware/software logic 2100 includes a jump execution unit 2106 coupled with execution unit 1602 and execution unit 1604. Each execution unit can execute the same instructions 2102, which includes compiler generated mov instructions to set the EU-exec register (mov eu-exec, 0x1; mov eu-exec, 0x2; mov eu-exec, 0x0). When the EU-exec value is set to 0x1 by the first mov instruction, EU0 (execution unit 1602) is enabled and EU1 (execution unit 1604) is disabled. The call instruction immediate after it is therefore executed only by execution unit 1602, as execution unit 1604 is disabled. Subsequently, execution unit 1602 execute the second mov instruction, causing EU-exec to be set to 0x2. In response execution unit 1604 is enabled and execution unit 1602 is disabled. Therefore, the second call is executed only by execution unit 1604. Finally after the second call returns EU-exec is reset to 0x0 by execution unit 1604, causing all execution units to be enabled. The illustrated logic sequence results in the serialization of the call instructions across the EUs of the fused EU.

This illustrated code sequence is sufficient when each callee from the compute kernel executed by the fused EU is a leaf function. If there are calls within a callee, then extra logic may be used to ensure that execution units are not inadvertently enabled while performing a virtual call function. For example, it may be possible for an execution unit to become enabled if a callee function is invoked from multiple contexts, with either EUs enabled simultaneously or only one EU enabled at a time. This scenario may occur because a callee may not know the context from which the callee is invoked. Accordingly, additional logic can be provided to support invocation of divergent functions from within a callee. For example and in one embodiment, if all EUs are enabled the callee can serialize divergent function calls by emitting the code sequence as in FIG. 21. However, if the current context has a single EU enabled, indicating that the caller has performed serialization, then callee may simply emit the function call. Exemplary logic to invoke a virtual function call from a callee is shown in Code Sequence 2 below.

Code Sequence 2 - EU-exec register
control logic bitmask for EU callee

```
B::bar( )
{
...
if (eu-exec == 0x0)
{ // This path taken only when B::bar( ) is uniform in caller
    mov eu-exec 0x1
    call r5, r6
    mov eu-exec 0x2
    call r5, r6
    mov eu-exec, 0x0
}
else
{ // This path when at least one EU is off as decided by caller
    call r5, r6
}
...
}
mov eu-exec, 0x1
call r2, r4 // B::bar( )
mov eu-exec, 0x2
call r2, r4 // A::bar( )
mov eu-exec, 0x0
```

In Code Sequence 2 above, B::bar( ) is a virtual function. In one embodiment, the caller can de-virtualize calls to the B::bar( ) function and determine that all channels of all EUs invoke this function then the function can be invoked with eu-exec=0. Otherwise if the compiler cannot determine with certainty that all channels target B::bar( ) then the compiler can generate instructions to serialize calls per EU. Accordingly, eu-exec will not be equal to 0x0 in this context.

The if-then block used in Code Sequence 2 is configured to serialize virtual calls and is executed when B::bar( ) is executed for all channels. Alternatively, the if-else block is executed when caller has already disabled some EUs for serialization and B::bar( ) was invoked as a divergent call.

In one embodiment, compiler logic can be configured to modify the conditional code of Code Sequence 2 to convert the conditional code flow into straight line code. The conversion to straight line code may provide improved performance relative to the conditional code of Code Sequence 2. For example, a compiler can optimize the code of Code Sequence 2 to produce the exemplary code of Code Sequence 3.

Code Sequence 3 - Straight Line (non-branching) code optimization

```
xor temp, eu-exec, 0x0
and eu-exec, temp, 0x1
call r2, r4
and eu-exec, temp, 0x2
call r2, r4 //will become no-op inside callee B::bar( )
move eu-exec, temp
```

The optimizations of Code Sequence 3 use an alternate EU-exec register mapping, as shown in Table 2 below.

TABLE 2

Alternate EU-exec register control logic bitmask for EU gating

| EU-exec value | Fused EU gating |
|---|---|
| 0b00 | Neither EU Executes Call |
| 0b01 | Only EU0 Executes Call |
| 0b10 | Only EU1 Executes Call |
| 0b11 | EU0 and EU1 Execute Call |

In one embodiment, one of multiple EU-exec register mappings, such as the mapping of Table 1 or the mapping of Table 2, can be selected by a control bit or a control register associated with a graphics processing engine including the fused EU described herein.

EU_id Register to Enable Support for Call Divergence

An additional embodiment provides a read-only EU_id register that returns the id of the execution unit from which the register is read. Such embodiment provides for simplified hardware logic relative to a hardware only or EU-exec register implementation. In one embodiment the the EU_id begins at 0 and increases monotonically in unit step. The EU_id register, in one embodiment, is an architecture register which resides in an architectural register file array (ARF), such ARF 1506 of FIG. 15.

In such embodiment, virtual calls are serialized without requiring execution units to be disabled. Instead, SIMD control flow is used to allow software to disable all but one execution unit at a time. Exemplary logic is shown in Code Sequence 4 below.

Code Sequence 4 - Pseudo code logic of serialization using EU_id

```
B::bar( )
{
cmp.eq.P1(8) null <1>:ud r0.0<8;8,1>:ud r0.0<8;8,1>:ud {Q1}
mov (1) V1:uw P1:uw {NoMask}
```

Code Sequence 4 - Pseudo code logic of serialization using EU_id

```
cmp.gt.P1 (8) null<1>:ud V1<0;1,0>:uw 0x0{Q1}
// P1 = 0xff when any channel is enabled and 0 if all channels are off
...
(P1) V1 = ...{NoMask}  ← NoMask instructions in B::bar( ) require P1 predicate
if (eu_id == 0) //SIMD_CF
{
    call r5, r6 {Q1}
}
else if(EU_id == 1)
{
    call r5, r6 {Q1}
}
}
main( ) {
...
if (EU_id == 0) //SIMD_CF
    call r2, r4 {Q1}
else if (EU_id == 1)
{
    call r2, r4 {Q1}
}
}
```

In the function of Code Sequence 4, a call is to be made to virtual function bar( ) In the trivial case, the compiler can prove that all channels invoke same function. In such case, a call instruction by itself is sufficient. In the case that the compiler cannot prove that all channels invoke same function, the compiler can serialize calls per EU.

In one embodiment the compiler can use a SIMD control flow if-else-endif construct provided by the instruction set of a graphics processor as described herein. The call instructions are guarded under SIMD control flow constructs, so that only one EU executes the call at a time. The first call in main( ) function is guarded under if(EU_id==0), which ensures execution mask (emask) bits will be enabled only for EU0. Similarly under the else branch, the emask will be enabled only for EU1 and other EUs will have emask bits reset.

Assuming the target of a call is B::bar( ) on EU0, and given that the instruction pointer register is shared by all EUs in the fused group, control in all EUs (e.g. EU0 and EU1 in this case) will jump to B::bar( ). As the emask enables only EU0, EU1 will skip executing instructions in B::bar( ). However, instructions marked with NoMask attribute can override the emask and get executed on EU1. This situation is inadvertent. Accordingly, additional logic is provided to ensure that NoMask instructions are not executed by disabled EU1.

In one embodiment, NoMask instructions are addressed using predication. A predicate P1 is computed in the prologue of a callee that has NoMask instructions that cannot be proven to be always uniform (e.g., enabled on all EUs). This predicate P1 is applied to all NoMask instructions in the function. P1 is either 0xffff:w (SIMD16) when any channel is enabled or 0=0:w (SIMD16) when all channels are disabled. When predicate is 0x0, NoMask instructions are gated off. P1 may be adjusted accordingly for SIMD widths other than SIMD16. This way, the combination of SIMD control flow in caller and predicate P1 in callee ensures that disabled EUs only step through the instruction pointer, but do not execute operations and do not commit results to the register file or memory. The result is that divergent calls are serialized and such serialization causes no side-effects in disabled EUs.

Figure 22:
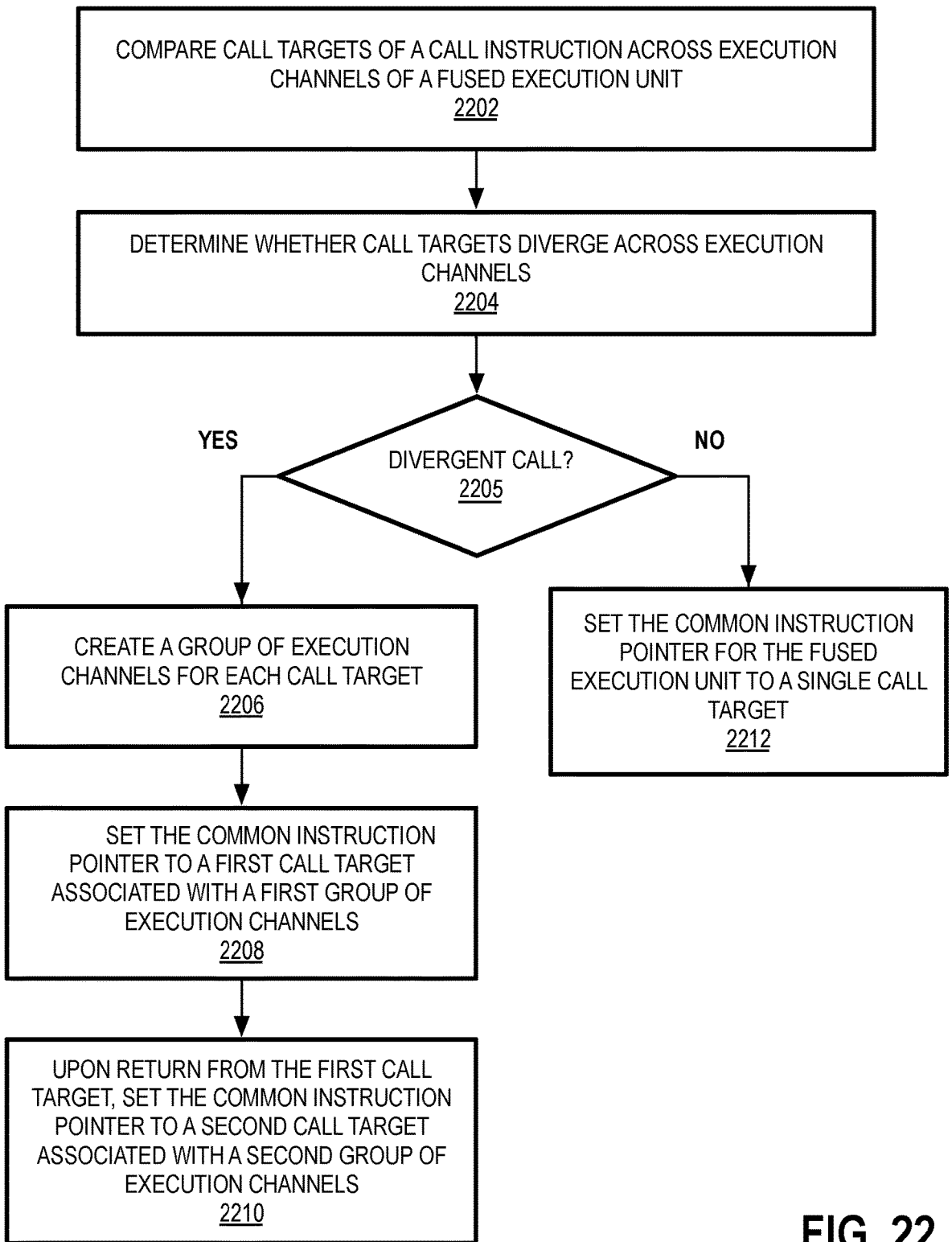
FIG. 22 is a flow diagram of virtual call support logic associated with a fused execution unit, according to an embodiment.

FIG. 22 is a flow diagram of virtual call support logic 2200 associated with a fused execution unit, according to an embodiment. In one embodiment the virtual call support logic 2200 is included within hardware logic coupled or associated with a fused execution unit. In one embodiment, at least a portion of the virtual call support logic 2200 is software logic associated with a compiler configured to compile programs for execution by the fused execution unit. As described herein, the fused execution unit includes multiple execution units having a common instruction pointer.

In one embodiment the virtual call support logic 2200 is configured to compare call targets of a call instruction across execution channels of a fused execution unit at 2202. The logic can further determine whether call targets diverge across execution channels at 2204. If at 2205 the virtual call support logic 2205 determines that the virtual call is not divergent, the virtual call support logic 2200 can set the common instruction pointer for the fused execution unit to a single call target 2212.

Alternatively, if a divergent call is detected at 2205, the virtual call support logic 2200 can create a group of execution channels for each call target at 2206, set the common instruction pointer to a first call target associated with a first group of execution channels at 2208, and upon return from the first call target, set the common instruction pointer to a second call target associated with a second group of execution channels at 2210, resulting in serialized execution of the execution channels associated with the differing call targets. The serialization is performed due to the shared instruction pointer of the the execution units within the fused execution, causing each execution unit within the fused execution unit to execute in lock-step.

FIG. 23 is a flow diagram of virtual call support logic 2300 associated with a fused execution unit, according to a further embodiment. In one embodiment, the virtual call support logic 2300 is performed within compiler logic that compiles program instructions for execution by a fused execution unit as described herein. The virtual call support logic 2300 can be configured to generate instructions to configure an EU-exec register, which is a read/write register that can be used to selectively enable or disable execution units within the fused execution unit, causing one or more execution units of the fused execution unit to be disabled during serialized execution of a divergent virtual call.

In one embodiment, the virtual call support logic 2300 can detect a virtual call within a set of instructions to be executed by a fused execution unit including a first execution unit and a second execution unit, where the first execution unit and the second execution unit share a common instruction pointer, as shown at 2302. The virtual call support logic 2300 can determine that the virtual call diverges into multiple call targets at 2304.

In response to such determination, the virtual call support logic 2300 can generate a first instruction to insert before a first instance of the virtual call, the first instruction to disable the second execution unit during execution of the first instance of the virtual call as shown at 2306. Disabling the second execution unit during the first instance of the virtual call enables the first instance to be executed without damaging data associated with the instructions being executed by the second execution unit.

The virtual call support logic 2300 can additionally, generate a second instruction to insert before a second instance of the virtual call, as shown at 2308. The second instruction is to disable the first execution unit during execution of the second instance of the virtual call.

The virtual call support logic 2300 can further generate a third instruction to enable all execution units of the fused execution unit after all instances of the virtual call are executed, as shown at 2310.

FIG. 24 is a flow diagram of additional virtual call support logic 2400, according to a further embodiment. In one embodiment the virtual call support logic 2400 is performed within compiler logic that compiles program instructions for execution by a fused execution unit as described herein. The virtual call support logic 2400 can be configured to generate instructions to read from an EU_id register, which is a read-only register that returns an execution unit identifier associated with the execution unit from which the register was read.

The virtual call support logic 2400 can detect a virtual call within a set of instructions to be executed by a fused execution unit including a first execution unit and a second execution unit, as shown at 2402. The first execution unit and the second execution unit can have a common instruction pointer and execute instructions in lock-step.

The virtual call support logic 2400 can further determine that the virtual call diverges to multiple call targets at 2404 and generate a first instruction to insert before a first instance of the virtual call, where the first instruction to restrict execution of the first instance of the virtual call to the first execution unit, as shown at 2406.

The virtual call support logic 2400 can then generate a second instruction to insert before a second instance of the virtual call, where the second instruction is configured to restrict execution of the second instance of the virtual call to the second execution unit, as shown at 2408.

The first instruction and the second instruction can be single instruction multiple data (SIMD) control flow instructions, such as an if-else-endif construct. Using the EU_id register, the instructions can configure instances of the virtual call to execute only on specific execution units. While certain instructions may be stepped through by unselected execution units, the instructions will not be executed and results will not be committed.

In one embodiment, an instruction within a virtual call that has a NOMASK attribute can inadvertently cause execution of an instruction on an execution unit that is not to be executing instructions during the serialization of the divergent virtual call. To address this issue, the virtual call support logic 2400 can generate a predicate mask for a nomask instruction within a serialized divergent virtual call to prevent execution of the instruction on a disabled execution unit, as shown at 2410.

Figure 25:
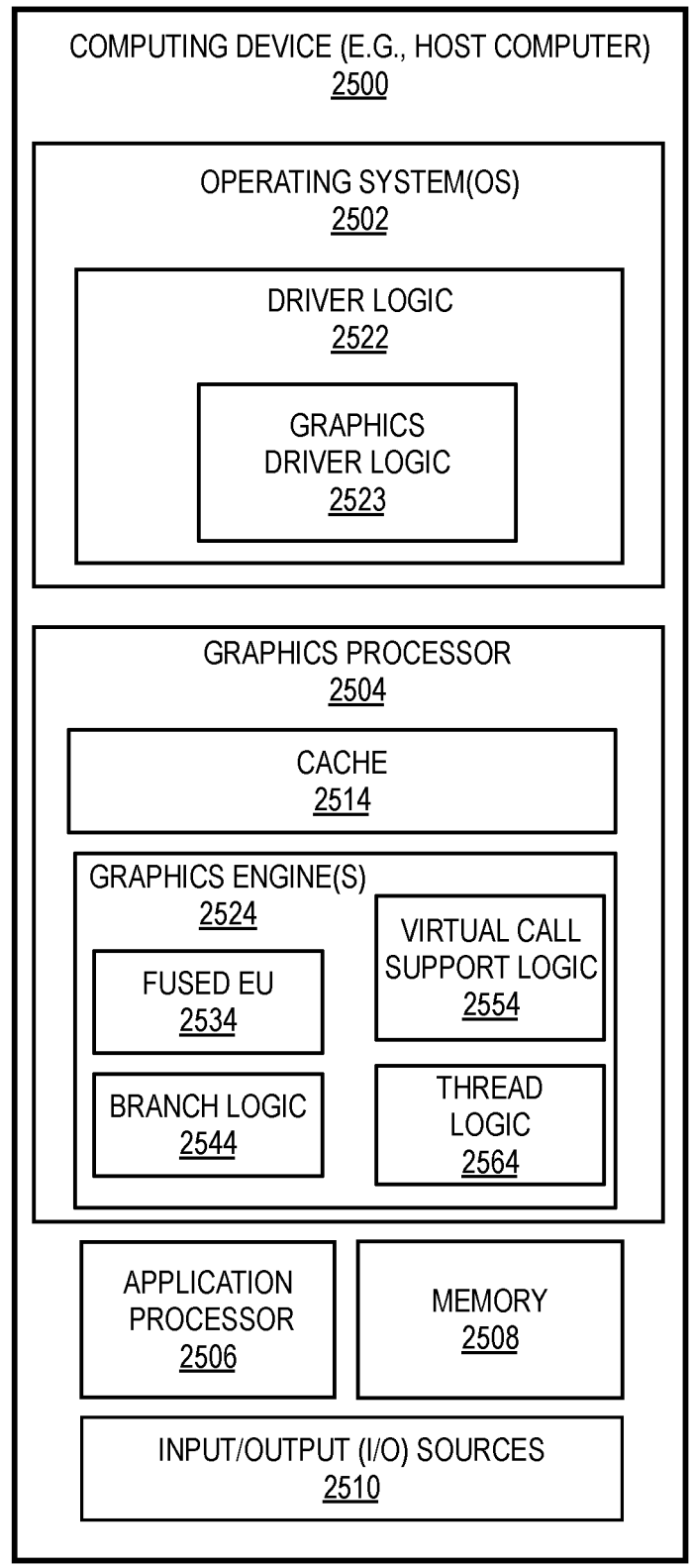
FIG. 25 is a block diagram of a computing device including a graphics processor, according to an embodiment.

FIG. 25 is a block diagram of a computing device 2500 including a graphics processor 2504, according to an embodiment. The computing device 2500 can be a computing device such as the data processing system 100 as in of FIG. 1. The computing device 2500 may also be or be included within a communication device such as a set-top box (e.g., Internet-based cable television set-top boxes, etc.), global positioning system (GPS)-based devices, etc. The computing device 2500 may also be or be included within mobile computing devices such as cellular phones, smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, the computing device 2500 includes a mobile computing device employing an integrated circuit ("IC"), such as system on a chip ("SoC" or "SOC"), integrating various hardware and/or software components of computing device 2500 on a single chip.

The computing device 2500 includes a graphics processor 2504. The graphics processor 2504 represents any graphics processor described herein. The graphics processor includes one or more graphics engine(s) 2524, such as the execution logic 600 of FIG. 6. The graphics engine(s) 2524 can include a fused execution unit (EU) 2534, branch logic 2544, virtual call support logic 2554, and thread control logic (e.g., thread logic 2564). The graphics processor 2504 and/or the graphics engine(s) 2524 can also include any number of control registers, general purpose registers, and/or architecture specific registers as described herein, such as an EU-exec or EU_ID register as described herein. The graphics processor can also include cache memory 2514, which can be a shared memory accessible by multiple components of the graphics processor 2504.

As illustrated, in one embodiment, in addition to a graphics processor 2504, the computing device 2500 may further include any number and type of hardware components and/or software components, such as (but not limited to) an application processor 2506, memory 2508, and input/output (I/O) sources 2510. The application processor 2506 can interact with a hardware graphics pipeline, as illustrated with reference to FIG. 3, to share graphics pipeline functionality. Processed data is stored in a buffer in the hardware graphics pipeline, and state information is stored in memory 2508. The resulting image is then transferred to a display controller for output via a display device, such as the display device 319 of FIG. 3. The display device may be of various types, such as Cathode Ray Tube (CRT), Thin Film Transistor (TFT), Liquid Crystal Display (LCD), Organic Light Emitting Diode (OLED) array, etc., and may be configured to display information to a user.

The application processor 2506 can include one or processors, such as processor(s) 102 of FIG. 1, and may be the central processing unit (CPU) that is used at least in part to execute an operating system (OS) 2502 for the computing device 2500. The OS 2502 can serve as an interface between hardware and/or physical resources of the computer device 2500 and a user. The OS 2502 can include driver logic 2522 for various hardware devices in the computing system 2500. The driver logic 2522 can include graphics driver logic 2523 such as the user mode graphics driver 1026 and/or kernel mode graphics driver 1029 of FIG. 10. In one embodiment the graphics processor 2504 and the application processor 2506 can be configured as a heterogeneous compute platform in which computational operations can be performed by either the graphic processor 2504 or the application processor 2506.

It is contemplated that in some embodiments, the graphics processor 2504 may exist as part of the application processor 2506 (such as part of a physical CPU package) in which case, at least a portion of the memory 2508 may be shared by the application processor 2506 and graphics processor 2504, although at least a portion of the memory 2508 may be exclusive to the graphics processor 2504, or the graphics processor 2504 may have a separate store of memory. The memory 2508 may comprise a pre-allocated region of a buffer (e.g., framebuffer); however, it should be understood by one of ordinary skill in the art that the embodiments are not so limited, and that any memory accessible to the lower graphics pipeline may be used. The memory 2508 may include various forms of random access memory (RAM) (e.g., SDRAM, SRAM, etc.) comprising an application that makes use of the graphics processor 2504 to render a desktop or 3D graphics scene. A memory controller hub, such as memory controller hub 116 of FIG. 1, may access data in the memory 2508 and forward it to graphics processor 2504 for graphics pipeline processing. The memory 2508 may be made available to other components within the computing device 2500. For example, any data (e.g., input graphics data) received from various I/O sources 2510 of the computing device 2500 can be temporarily queued into memory 2508 prior to their being operated upon by one or more processor(s) (e.g., application processor 2506) in the implementation of a software program or application. Similarly, data that a software program determines should be sent from the computing device 2500 to an outside entity through one of the computing system interfaces, or stored into an internal storage element, is often temporarily queued in memory 2508 prior to its being transmitted or stored.

The I/O sources can include devices such as touchscreens, touch panels, touch pads, virtual or regular keyboards, virtual or regular mice, ports, connectors, network devices, or the like, and can attach via an input/output (I/O) control hub (ICH) 130 as referenced in FIG. 1. Additionally, the I/O sources 2510 may include one or more I/O devices that are implemented for transferring data to and/or from the computing device 2500 (e.g., a networking adapter); or, for a large-scale non-volatile storage within the computing device 2500 (e.g., hard disk drive). User input devices, including alphanumeric and other keys, may be used to communicate information and command selections to graphics processor 2504. Another type of user input device is cursor control, such as a mouse, a trackball, a touchscreen, a touchpad, or cursor direction keys to communicate direction information and command selections to GPU and to control cursor movement on the display device. Camera and microphone arrays of the computer device 2500 may be employed to observe gestures, record audio and video and to receive and transmit visual and audio commands.

I/O sources 2510 configured as network interfaces can provide access to a network, such as a LAN, a wide area network (WAN), a metropolitan area network (MAN), a personal area network (PAN), Bluetooth, a cloud network, a cellular or mobile network (e.g., $3^{rd}$ Generation (3G), $4^{th}$ Generation (4G), etc.), an intranet, the Internet, etc. Network interface(s) may include, for example, a wireless network interface having one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11 standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

It is to be appreciated that a lesser or more equipped system than the example described above may be preferred for certain implementations. Therefore, the configuration of the computing device 2500 may vary from implementation to implementation depending upon numerous factors, such as price constraints, performance requirements, technological improvements, or other circumstances. Examples include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any one or a combination of: one or more microchips or integrated circuits interconnected using a parent-board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Various components can be a means for performing the operations or functions described.

Embodiments described herein provide support for divergent control flow in heterogeneous compute operations on a fused execution unit. On embodiment provides for a processing apparatus comprising a fused execution unit including multiple graphics execution units having a common instruction pointer; logic to serialize divergent function calls by the fused execution unit, the logic configured to compare a call target of execution channels within the fused execution unit and create multiple groups of channels, each group of channels associated with a single call target; and wherein the fused execution unit is to execute a first group of channels via a first execution unit and a second group of channels via a second execution unit.

One embodiment provides for a method comprising comparing call targets of a call instruction across execution channels of a fused execution unit including multiple execution units having a common instruction pointer; determining that all enabled execution channels reference a single call target; and setting the common instruction pointer to the single call target. In a further embodiment, the method additionally includes determining that the execution channels reference multiple call targets; creating a group of execution channels for each call target; setting the common instruction pointer to a first call target associated with a first group of execution channels; and upon return from the first call target, setting the common instruction pointer to a second call target associated with a second group of execution channels.

One embodiment provides for a machine-readable medium storing instructions which, when executed by one or more processors, cause the one or more processors to perform operations comprising detecting a virtual call within a set of instructions to be executed by a fused execution unit including a first execution unit and a second execution unit, the first execution unit and the second execution unit having a common instruction pointer; determining that the virtual call diverges to multiple call targets; generating a first instruction to insert before a first instance of the virtual call, the first instruction to disable the second execution unit during execution of the first instance of the virtual call; generating a second instruction to insert before a second instance of the virtual call, the second instruction to disable the first execution unit during execution of the second instance of the virtual call; and generating a third instruction to enable all execution units of the fused execution unit after all instances of the virtual call are executed.

One embodiment provides for a machine-readable medium storing instructions which, when executed by one or more processors, cause the one or more processors to perform operations comprising detecting a virtual call within a set of instructions to be executed by a fused execution unit including a first execution unit and a second execution unit, the first execution unit and the second execution unit having a common instruction pointer; determining that the virtual call diverges to multiple call targets; generating a first instruction to insert before a first instance of the virtual call, the first instruction to restrict execution of the first instance of the virtual call to the first execution unit; and generating a second instruction to insert before a second instance of the virtual call, the second instruction to restrict execution of the second instance of the virtual call to the second execution unit.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A processing apparatus comprising:
a processor having a fused execution unit including multiple graphics execution units having a common instruction pointer, the fused execution unit having one or more thread controllers to execute hardware threads to facilitate simultaneous multi-threading (SMT) and fine-grained interleaved multi-threading (IMT),
wherein the processor further having hardware logic, outside of the multiple graphics execution units, to serialize divergent function calls by the fused execution unit, the hardware logic configured to compare a call target of execution channels within the fused execution unit and create multiple groups of channels, each group of channels associated with a same call target if the execution channels do not share a common call target based on the comparison,
wherein the fused execution unit is to execute a first group of channels via a first execution unit and a second group of channels via a second execution unit, wherein the fused execution unit is assigned the one or more thread controllers such that a first thread controller is assigned to execute first threads associated with the first execution unit, and a second thread controller is assigned to execute second threads associated with the second execution unit, wherein the first threads and the second threads represent different sets of threads corresponding to a program that is executed in lock-step by the fused execution unit, and
wherein the fused execution unit is to serially execute the multiple groups of channels.

2. The processing apparatus as in claim 1, wherein each of the multiple groups of channels is associated with a separate execution unit.

3. The processing apparatus as in claim 1, wherein the fused execution unit includes at least two execution units.

4. The processing apparatus as in claim 3, wherein each of the at least two execution units are configured to execute multiple execution threads.

5. The processing apparatus as in claim 1, wherein the fused execution unit is to execute the first group of channels via the first execution unit while the second execution unit is disabled.

6. The processing apparatus as in claim 1, wherein the fused execution unit is to execute the second group of channels via a second execution unit while the first execution unit is disabled.

7. The processing apparatus as in claim 1, wherein the fused execution unit is to execute the first group of channels or the second group of channels via the first and second execution unit.

8. The processing apparatus as in claim 1, wherein the logic to serialize divergent function calls by the fused execution unit is hardware logic coupled to the fused execution unit.

9. The processing apparatus as in claim 1, additionally comprising a first register to enable the multiple graphics execution units of the fused execution unit to be individually enabled or disabled.

10. The processing apparatus as in claim 1, additionally comprising a second register, wherein an instruction to read the second register returns an identifier of the execution unit on which the instruction to read the second register is executed.

11. The processing apparatus as in claim 1, wherein the hardware logic includes a jump execution unit.

12. The processing apparatus as in claim 11, wherein the jump execution unit includes comparison logic to compare call targets of all of the execution channels to determine if all the execution channels have a common call target.

13. The processing apparatus as in claim 12, wherein the jump execution unit is operable to set a shared instruction pointer to the common call target if all the execution channels have the common call target.

14. The processing apparatus as in claim 13, wherein the comparison logic is operable to operable to create set the shared instruction pointer to create the multiple groups of channels such that each of the multiple groups includes call targets that are identical.

15. The processing apparatus as in claim 14, wherein the fused execution unit is to execute the first group of channels of the multiple groups of channels via the first execution unit while the second execution unit is disabled and to execute the second group of channels of the multiple groups of channels via a second execution unit while the first execution unit is disabled.

16. A processing system comprising:
a computing device including a processor having a fused execution unit including multiple graphics execution units having a common instruction pointer, the fused execution unit having one or more thread controllers to execute hardware threads to facilitate simultaneous multi-threading (SMT) and fine-grained interleaved multi-threading (IMT);
wherein the processor having hardware logic that is outside of the multiple graphics execution units, the hardware logic including a jump execution logic to serialize divergent function calls by the fused execution unit, the hardware logic having comparison logic configured to compare a call target of execution channels within the fused execution unit and create multiple groups of channels, each group of channels associated with a same call target if the execution channels do not share a common call target based on the comparison,
wherein the fused execution unit is to execute a first group of channels via a first execution unit and a second group of channels via a second execution unit, wherein the fused execution unit is to execute the first group of channels of the multiple groups of channels via the first execution unit while the second execution unit is disabled and to execute the second group of channels of the multiple groups of channels via a second execution unit while the first execution unit is disabled, wherein the fused execution unit is assigned the one or more thread controllers such that a first thread controller is assigned to execute first threads associated with the first execution unit, and a second thread controller is assigned to execute second threads associated with the second execution unit, wherein the first threads and the second threads represent different sets of threads corresponding to a program that is executed in lock-step by the fused execution unit, and
wherein the fused execution unit is to serially execute the multiple groups of channels.

17. The processing apparatus as in claim 16, wherein the jump execution logic includes comparison logic to compare call targets of all of the execution channels to determine if all the execution channels have the common call target.

18. The processing apparatus as in claim 16, wherein the jump execution unit is operable to set shared instruction pointer to the common call target if all the execution channels have the common call target, and further wherein the comparison logic is operable to operable to create set the shared instruction pointer to create the multiple groups of channels such that each of the multiple groups includes call targets that are identical.

19. The processing apparatus as in claim 18, wherein the first and second execution units operate in lock-step.

20. A method comprising:

serializing divergent function calls by the fused execution unit using hardware logic that is outside of a fused execution unit having multiple graphics execution units having a common instruction pointer, the fused execution unit having one or more thread controllers to execute hardware threads to facilitate simultaneous multi-threading (SMT) and fine-grained interleaved multi-threading (IMT);

comparing a call target of execution channels within the fused execution unit, and creating multiple groups of channels, each group of channels associated with a same call target if the execution channels do not share a common call target based on the comparison; and executing, using the fused execution unit, a first group of channels via a first execution unit and a second group of channels via a second execution unit, wherein the fused execution unit is assigned the one or more thread controllers such that a first thread controller is assigned to execute first threads associated with the first execution unit, and a second thread controller is assigned to execute second threads associated with the second execution unit, wherein the first threads and the second threads represent different sets of threads corresponding to a program that is executed in lock-step by the fused execution unit, wherein the fused execution unit is to serially execute the multiple groups of channels.

21. The method as in claim 20, wherein each of the multiple groups of channels is associated with a separate execution unit.

22. The method as in claim 20, wherein the fused execution unit includes at least two execution units.

* * * * *